(12) United States Patent
Xiang et al.

(10) Patent No.: US 12,548,293 B2
(45) Date of Patent: Feb. 10, 2026

(54) IMAGE DETECTION METHOD AND APPARATUS

(71) Applicant: Tencent Technology (Shenzhen) Company Limited, Guangdong (CN)

(72) Inventors: Jinxi Xiang, Guangdong (CN); Sen Yang, Guangdong (CN); Jun Zhang, Guangdong (CN); Dongxian Jiang, Guangdong (CN); Yingyong Hou, Guangdong (CN); Xiao Han, Guangdong (CN)

(73) Assignee: Tencent Technology (Shenzhen) Compay Limited, Shenzhen (CN)

( * ) Notice: Subject to any disclaimer, the term of this patent is extended or adjusted under 35 U.S.C. 154(b) by 335 days.

(21) Appl. No.: 18/378,405

(22) Filed: Oct. 10, 2023

(65) Prior Publication Data
US 2024/0054760 A1   Feb. 15, 2024

Related U.S. Application Data

(63) Continuation of application No. PCT/CN2022/137773, filed on Dec. 9, 2022.

(30) Foreign Application Priority Data

Mar. 23, 2022   (CN) .......................... 202210288699.0

(51) Int. Cl.
*G06V 10/40*   (2022.01)
*G06V 10/26*   (2022.01)
(Continued)

(52) U.S. Cl.
CPC .......... *G06V 10/762* (2022.01); *G06V 10/267* (2022.01); *G06V 10/40* (2022.01);
(Continued)

(58) Field of Classification Search
CPC ............... G06V 10/762; G06V 10/806; G06V 10/7715; G06V 10/40; G06V 10/267; G06V 10/776; G06V 10/764
See application file for complete search history.

(56) References Cited

U.S. PATENT DOCUMENTS

| 2010/0111396 | A1 | 5/2010 | Boucheron |
| 2022/0058446 | A1 | 2/2022 | Chen |
| 2022/0237788 | A1* | 7/2022 | Shaul ..................... G16H 50/70 |

FOREIGN PATENT DOCUMENTS

| CN | 111046980 | 4/2020 |
| CN | 111553419 | 8/2020 |

(Continued)

OTHER PUBLICATIONS

Japanese-language Office Action issued in Japanese Application No. 2024-553679 dated Aug. 5, 2025, with English translation (6 pages).
(Continued)

*Primary Examiner* — Sumati Lefkowitz
*Assistant Examiner* — Michael Adam Shariff
(74) *Attorney, Agent, or Firm* — Crowell & Moring LLP

(57) ABSTRACT

An image detection method and apparatus are disclosed. The method includes: performing feature extraction processing on the image to obtain a feature representation subset of the image; generating attention weights corresponding to the at least two sub-image features; performing weighting aggregation processing on the at least two sub-image features according to the attention weights to obtain a first feature vector; performing clustering sampling processing on the at least two sub-image features to obtain at least two classification clusters comprising sampled sub-image features; determining a block sparse self-attention for each of the sampled sub-image features according to the at least two classification clusters and a block sparse matrix; determining a second feature vector according to at least two block sparse (Continued)

self-attentions respectively corresponding to the at least two classification clusters; and determining a classification result of the image according to the first feature vector and the second feature vector.

20 Claims, 12 Drawing Sheets

(51) Int. Cl.
*G06V 10/762* (2022.01)
*G06V 10/764* (2022.01)
*G06V 10/77* (2022.01)
*G06V 10/776* (2022.01)
*G06V 10/80* (2022.01)

(52) U.S. Cl.
CPC ........ *G06V 10/764* (2022.01); *G06V 10/7715* (2022.01); *G06V 10/776* (2022.01); *G06V 10/806* (2022.01)

(56) References Cited

FOREIGN PATENT DOCUMENTS

| CN | 112668608 A | 4/2021 |
|---|---|---|
| CN | 113688886 | 11/2021 |
| CN | 114693624 | 7/2022 |
| WO | WO 2020/261183 A1 | 12/2020 |
| WO | WO2021/099584 | 5/2021 |
| WO | WO 2022/015819 A1 | 1/2022 |

OTHER PUBLICATIONS

Extended European Search Report issued in European application No. 229331509, dated Jan. 28, 2025, 14 pages.
Sharma et al. "Cluster-to-Conquer: A Framework for End-to-End Multi-Instance Learning for Whole Slide Image Classification," Proceedings of Machine Learning Research, Arxiv.org, Cornell University Library, Jun. 2021, 17 pages.
Jiang et al., "MHAttnSurv: Multi-Head Attention for Survival Prediction Using Whole-Slide Pathology Images," Arxiv.org, Cornell University Library, Oct. 2021, 26 pages.
Wu et al., "DeepGCNMIL: Multi-head Attention Guided Multi-Instance Learning Approach for Whole-Slide Images Survival Analysis Using Graph Convolutional Networks," Proceedings of the 2022 International Conference on Management of Data, Feb. 2022, 7 pages.
Ilse et al. "Attention-based Deep Multiple Instance Learning," Arxiv.org, Cornell University Library, Feb. 2018, 16 pages.
Lu et al., Data Efficient and Weakly Supervised Computational Pathology on Whole Slide Images, Arxiv.org, Cornell University Library, May 2020, 35 pages.
International Search Report issued Mar. 2, 2023 in International (PCT) Application No. PCT/CN2022/137773.

\* cited by examiner

Group 1　Group 2　Group 3　Group 4

IMAGE DETECTION METHOD AND APPARATUS

RELATED APPLICATION

This application is a continuation application of PCT Patent Application No. PCT/CN2022/137773, filed on Dec. 9, 2022, which claims priority to Chinese Patent Application No. 2022102886990, entitled "IMAGE DETECTION METHOD AND APPARATUS, DEVICE, AND READABLE STORAGE MEDIUM" filed with the China National Intellectual Property Administration on Mar. 23, 2022, wherein the content of the above-referenced applications is incorporated herein by reference in its entirety.

FIELD OF THE TECHNOLOGY

This disclosure relates to the field of computer technologies, and specifically to an image detection technology.

BACKGROUND OF THE DISCLOSURE

In the classical machine learning image classification problem, it is often assumed that an image clearly belongs to a certain category. However, in practical applications, a plurality of instances will be observed in an image, and a label of the image only describes the category of one instance. This problem is commonly referred to as multiple instance learning (MIL). The purpose of MIL is to establish an MTh model by learning multi-instance images with classification labels, and then apply the MIL model to the detection of unknown multi-instance images.

In the related art, a self-attention module may be used to mine information of all instances in the existing multi-instance images, find out relevant information between the instances, and establish the MTh model to detect the unknown multi-instance images. However, the self-attention module has high computational complexity. When modeling digital pathological images, which may be multi-instance images having about 10,000 instances, a lot of hardware resources and time will be consumed, and the training is difficult. Moreover, the number of digital pathological images is small, and each image only corresponds to a whole label of multi-instance images. Supervision information is very weak. It is difficult to ensure that the self-attention module can mine effective information when training such a high-complexity self-attention module on a small data set, and the self-attention module is prone to over-fitting, resulting in low detection accuracy.

SUMMARY

This disclosure provides an image detection method and apparatus, a device, and a readable storage medium, which may improve the detection speed and detection accuracy of images.

An aspect of this disclosure provides an image detection method, which is performed by a computer device and includes:
  obtaining an image;
  performing feature extraction processing on the image to obtain a feature representation subset of the image, the image comprising at least two sub-images, the feature representation subset comprising at least two sub-image features, and the at least two sub-image features corresponding to the at least two sub-images respectively;
  generating attention weights corresponding to the at least two sub-image features;
  performing weighting aggregation processing on the at least two sub-image features according to the attention weights to obtain a first feature vector;
  performing clustering sampling processing on the at least two sub-image features to obtain at least two classification clusters comprising sampled sub-image features;
  determining a block sparse self-attention for each of the sampled sub-image features according to the at least two classification clusters and a block sparse matrix;
  determining a second feature vector according to at least two block sparse self-attentions respectively corresponding to the at least two classification clusters, a block sparse self-attention for a sampled sub-image feature being determined based on sampled sub-image features in a classification cluster to which the sampled sub-image feature belongs; and
  determining a classification result of the image according to the first feature vector and the second feature vector.

Another aspect of this disclosure provides an image detection method, which is performed by a computer device and includes:
  obtaining a sample image;
  performing feature extraction processing on the sample image to obtain a sample feature representation subset of the sample image, the sample image comprising at least two sample sub-images, the sample feature representation subset comprising at least two sample sub-image features, and the at least two sample sub-image features corresponding to the at least two sample sub-images respectively;
  inputting the at least two sample sub-images into an initial image recognition model, generating sample attention weights corresponding to the at least two sample sub-image features using the initial image recognition model;
  performing weighting aggregation processing on the at least two sample sub-image features according to the sample attention weights corresponding to the at least two sample sub-image features to obtain a first sample feature vector;
  performing clustering sampling processing on the at least two sample sub-image features using the initial image recognition model to obtain at least two sample classification clusters comprising sample sampled sub-image features;
  determining a sample block sparse self-attention for each of the sample sampled sub-image features according to the at least two sample classification clusters and a block sparse matrix;
  determining a second sample feature vector according to at least two sample block sparse self-attentions respectively corresponding to the at least two sample classification clusters, a sample block sparse self-attention for a sample sampled sub-image feature being determined based on sample sampled sub-image features in a sample classification cluster to which the sample sampled sub-image feature belongs;
  determining a sample classification result of the sample image according to the first sample feature vector and the second sample feature vector using the initial image recognition model; and
  adjusting model parameters of the initial image recognition model according to the at least two sample classification clusters, the attention weights corresponding to the at least two sample sub-image features, the sample classification result, and a classification label corresponding to the sample image to obtain an image recognition model for recognizing a classification result of an image.

Another aspect of this disclosure provides an image detection apparatus, including a memory operable to store computer-readable instructions and a processor circuitry operable to read the computer-readable instructions. When executing the computer-readable instructions, the processor circuitry is configured to:

obtain an image;

perform feature extraction processing on the image to obtain a feature representation subset of the image, the image comprising at least two sub-images, the feature representation subset comprising at least two sub-image features, and the at least two sub-image features corresponding to the at least two sub-images respectively;

generate attention weights corresponding to the at least two sub-image features;

perform weighting aggregation processing on the at least two sub-image features according to the attention weights to obtain a first feature vector;

perform clustering sampling processing on the at least two sub-image features to obtain at least two classification clusters comprising sampled sub-image features;

determine a block sparse self-attention for each of the sampled sub-image features according to the at least two classification clusters and a block sparse matrix;

determine a second feature vector according to at least two block sparse self-attentions respectively corresponding to the at least two classification clusters, a block sparse self-attention for a sampled sub-image feature being determined based on sampled sub-image features in a classification cluster to which the sampled sub-image feature belongs; and determine a classification result of the image according to the first feature vector and the second feature vector.

Another aspect of this disclosure provides non-transitory machine-readable media, having instructions stored on the machine-readable media. When being executed, the instructions may be configured to cause a machine to:

obtain an image;

perform feature extraction processing on the image to obtain a feature representation subset of the image, the image comprising at least two sub-images, the feature representation subset comprising at least two sub-image features, and the at least two sub-image features corresponding to the at least two sub-images respectively;

generate attention weights corresponding to the at least two sub-image features;

perform weighting aggregation processing on the at least two sub-image features according to the attention weights to obtain a first feature vector;

perform clustering sampling processing on the at least two sub-image features to obtain at least two classification clusters comprising sampled sub-image features;

determine a block sparse self-attention for each of the sampled sub-image features according to the at least two classification clusters and a block sparse matrix;

determine a second feature vector according to at least two block sparse self-attentions respectively corresponding to the at least two classification clusters, a block sparse self-attention for a sampled sub-image feature being determined based on sampled sub-image features in a classification cluster to which the sampled sub-image feature belongs; and determine a classification result of the image according to the first feature vector and the second feature vector.

Another aspect of this disclosure provides a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, whereby the computer device performs the method according to this embodiment of this disclosure.

In this disclosure, an image including at least two sub-images may be subjected to feature extraction processing to obtain a feature representation subset of the image. The feature representation subset includes sub-image features corresponding to the at least two sub-images. Then information of the sub-images is mined in two manners. In the first manner, the information of each sub-image is independently mined. That is, attention weights corresponding to the at least two sub-image features are generated, and then weighting aggregation processing is performed on the at least two sub-image features according to the attention weights to obtain a first feature vector. In the second manner, relevant information between the sub-images of the same category is mined. That is, clustering sampling processing is performed on the at least two sub-image features to obtain sampled sub-image features included in at least two classification clusters. A block sparse self-attention corresponding to each sampled sub-image feature is determined according to the at least two classification clusters and a block sparse matrix. A second feature vector is determined according to the at least two block sparse self-attentions. Finally, a classification result of the image is determined according to the first feature vector and the second feature vector. With the method according to this embodiment of this disclosure, the first feature vector and the second feature vector obtained by the two information mining manners may complement and constrain each other. Therefore, the detection accuracy of images may be improved. In addition, a block sparse self-attention corresponding to a sampled sub-image feature may be calculated by the block sparse matrix, thereby only paying attention to the correlation between sampled sub-image features belonging to the same classification cluster with the sampled sub-image feature, reducing the computational complexity, and improving the detection speed.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. Based on the embodiments in this disclosure, all the other embodiments obtained by a person of ordinary skill in the art without involving any inventive effort fall within the scope of protection of this disclosure.

The solution provided by the embodiments of this disclosure relates to computer vision, machine learning, deep learning, and other technologies of artificial intelligence, and is specifically described by the following embodiments.

Figure 1A:
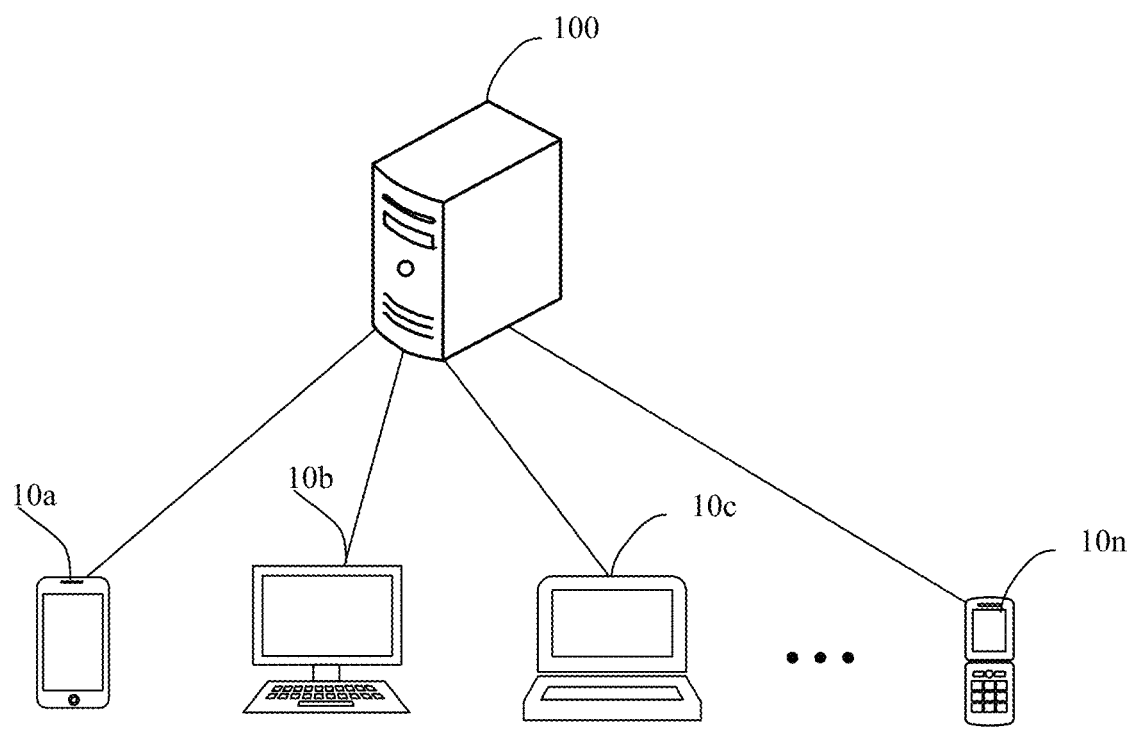
FIG. 1a is a schematic diagram of a network architecture according to an embodiment of this disclosure.

Reference is made to FIG. 1*a*. FIG. 1*a* is a schematic diagram of a network architecture according to an embodiment of this disclosure. As shown in FIG. 1*a*, the network architecture may include a service server 100 and a terminal device cluster. The terminal device cluster may include a terminal device 10*a*, a terminal device 10*b*, a terminal device 10*c*, . . . , a terminal device 10*n*. Any terminal device in the terminal device cluster may have a communication connection with the service server 100, for example, a communication connection between the terminal device 10*a* and the service server 100, a communication connection between the terminal device 10*b* and the service server 100, and a communication connection between the terminal device 10*c* and the service server 100. The communication connection, not limited to a connection manner, may be direct or indirect connection via wired communication, direct or indirect connection via wireless communication, or connection in other manners. This disclosure is not limited thereto.

It is to be understood that each terminal device in the terminal cluster shown in FIG. 1*a* may be equipped with an application client. When the application client runs in each terminal device, data interaction may be performed with the service server 100 shown in FIG. 1*a*, respectively, whereby the service server 100 may receive service data from each terminal device. The application client may be an application client with related image processing functions such as game application, video editing application, social application, instant messaging application, livestreaming application, short video application, video application, music application, shopping application, novel application, payment application, and browser. The application client may be an independent client or an embedded sub-client integrated in a client (such as an instant messaging client, a social client, and a video client), which is not limited herein.

As shown in FIG. 1*a*, each terminal device in the terminal device cluster may obtain an image by running the application client, and transmit the image to the service server 100 as service data. The service server 100 may perform image detection on the image to determine a classification result of the image. The image may also be referred to as a multi-instance image, which includes at least two sub-images. One sub-image may be referred to as an instance. For the multi-instance image, as long as one instance is abnormal, the multi-instance image may be regarded as an abnormal image. In other words, as long as one sub-image is abnormal, the classification result of the image shall be an abnormal image.

In a feasible embodiment, the image is a digital pathological image. The digital pathological image may be obtained by: acquiring high-resolution digital images by scanning carrier slices with a fully-automatic microscope or an optical amplification system, and then automatically performing high-precision multi-field seamless mosaic and processing on a digital image with high distribution rate by using a computer, so as to obtain high-quality visual data, that is, to obtain the digital pathological image. The digital pathological image may be enlarged and reduced at any position in a computer device, and there is no problem of image information distortion and unclear details. Compared with the original carrier slice observation, it is more convenient for doctors to perform pathological diagnosis such as cancer diagnosis, survival time detection, and gene mutation detection. But the digital pathological image has high resolution, large image size, and many instances (cells, genes, and other biological tissues). When observing the digital pathological image manually, it is required to constantly adjust the detection position and detection multiple, which often consumes a lot of time and energy. Therefore, the digital pathological image may be uploaded through the application client. After obtaining the digital pathological image, the terminal device may transmit the digital pathological image as service data to the service server 100. Further, the service server 100 may detect the digital pathological image and determine a classification result of the digital pathological image. The classification result may assist doctors in medical diagnosis.

Figure 1B:
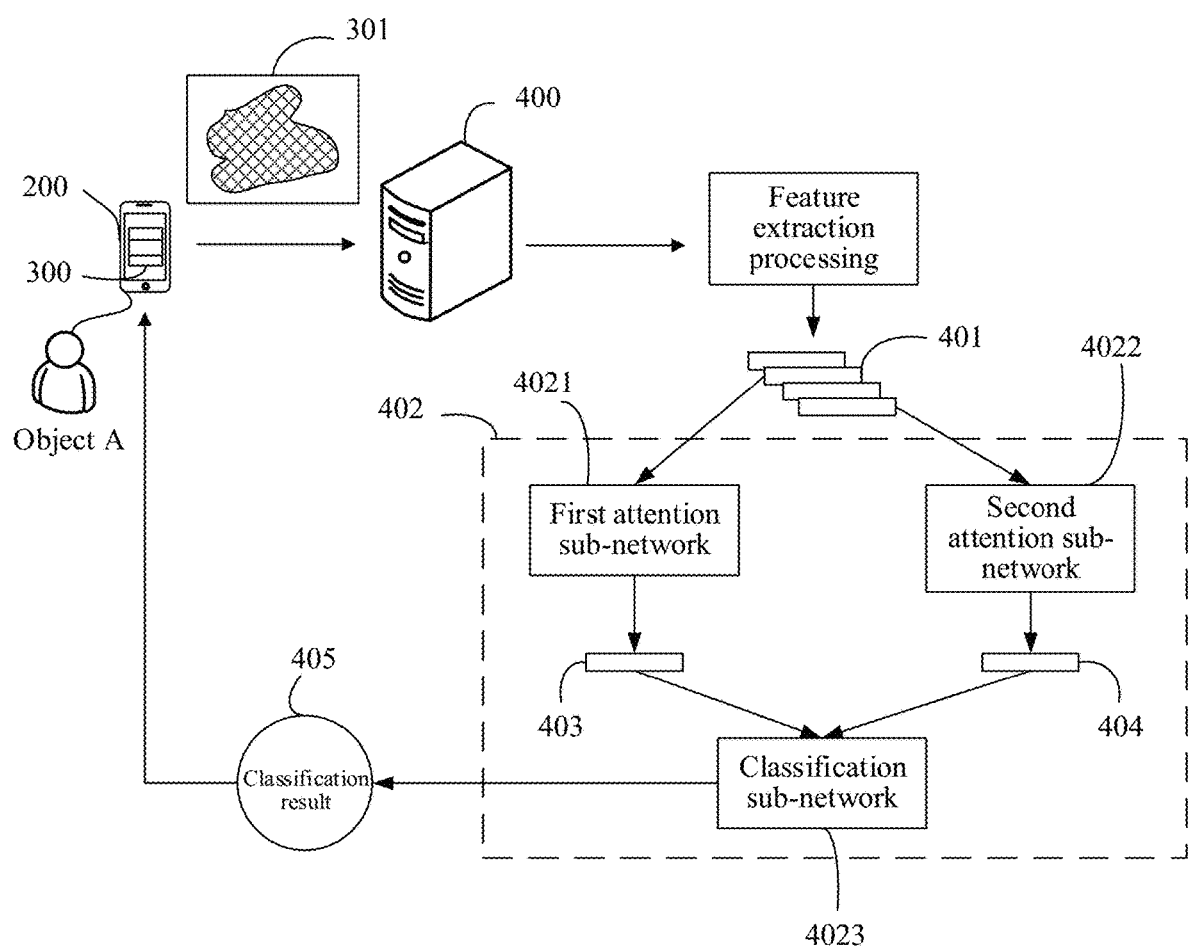
FIG. 1B is a schematic diagram of an application scenario of an image detection method according to an embodiment of this disclosure.

After the service server 100 obtains the image, the image may be detected, and the classification result of the image is determined. For the specific implementation process, reference is made to FIG. 1B. FIG. 1B is a schematic diagram of an application scenario of an image detection method according to an embodiment of this disclosure. For ease of understanding, the image is still described as a digital pathological image in the foregoing implementation. As shown in FIG. 1*b*, a terminal device 200 (which may be any of the terminal devices in FIG. 1*a*, such as the terminal device 10*a*) is equipped with a patient management application 300. Object A has an association relationship with the terminal device 200. Assuming that object A is an attending physician of object B, object A may view patient data of object B, such as a colorectal pathological image 301, on a patient management application 300. By observing the colorectal pathological image 301, object A may diagnose whether object B suffers from colorectal cancer. The image size of the colorectal pathological image 301 is large, there are many cell tissues to be observed, and the time required for manual observation of object A is long. Therefore, object A may initiate an image detection request for the colorectal pathological image 301 to a service server 400 (for example, the service server 100 shown in FIG. 1a) through the patient management application 300 running on the terminal device 200. Then the service server 400 may perform image detection on the colorectal pathological image 301 to determine the classification result of the colorectal pathological image 301, that is, determine whether the colorectal pathological image 301 is a normal image or an abnormal image. The classification result of the colorectal pathological image 301 by the service server 400 may assist object A in diagnosing the condition of object B.

It is to be understood that the colorectal pathological image 301 has a large image size and contains a large number of cell tissues. Therefore, it may be considered that the colorectal pathological image 301 includes at least two sub-images (that is, at least two sub-images may be obtained by dividing the colorectal pathological image 301). The colorectal pathological image 301 is an abnormal image as long as there is an abnormality in one of the sub-images.

As shown in FIG. 1B, after the terminal device 200 transmits the colorectal pathological image 301 to the service server 400, the service server 400 may first perform feature extraction processing on the colorectal pathological image 301 to obtain a feature representation subset 401 for representing the colorectal pathological image 301. The feature representation subset 401 includes at least two sub-image features, and one sub-image feature is used for describing information of one sub-image in the colorectal pathological image 301. Subsequently, the service server 400 may detect the colorectal pathological image 301 using an image recognition model 402. The image recognition model 402 may include a first attention sub-network 4021, a second attention sub-network 4022, and a classification sub-network 4023. The first attention sub-network 4021 is configured to treat the sub-images as independent instances. Independent representation information of each sub-image is mined according to each sub-image feature to obtain a first feature vector for representing the independent representation information. The second attention sub-network 4022 is configured to mine global representation information among all sub-images to obtain a second feature vector for representing the global representation information. The classification sub-network 4023 is configured to classify the image according to the first feature vector and the second feature vector, and determine a classification result of the image.

As shown in FIG. 1B, after the service server 400 inputs the feature representation subset 401 into the image recognition model 402, the first attention sub-network 4021 generates attention weights corresponding to the at least two sub-image features, and then performs weighting aggregation processing on the at least two sub-image features according to the attention weights to obtain a first feature vector 403. Also, the second attention sub-network 4022 performs clustering sampling processing on the at least two sub-image features to obtain sampled sub-image features included in at least two classification clusters, then determines a block sparse self-attention corresponding to each sampled sub-image feature according to the at least two classification clusters and a block sparse matrix, and determines a second feature vector 404 according to the at least two block sparse self-attentions. After determining the first feature vector 403 and the second feature vector 404, the classification sub-network 4023 may perform feature fusion processing on the first feature vector 403 and the second feature vector 404 to obtain a fusion feature vector, and then perform classification processing on the fusion feature vector to obtain a classification result 405 of the colorectal pathological image 301. The classification result 405 may include a normal probability and an abnormal probability of the colorectal pathological image 301. The normal probability refers to a probability that the colorectal pathological image 301 is a normal image, that is, a probability that object B is not sick. The abnormal probability refers to a probability that the colorectal image 301 is an abnormal image, that is, a probability that object B may suffer from colorectal cancer. The service server 400 returns the classification result 405 to the terminal device 200, and object A may diagnose the illness of object B according to the classification result 405.

In some implementations, if the image recognition model 402 is stored locally in the terminal device 200, the terminal device 200 may perform an image detection task locally for the image and obtain a classification result of the image. Since a large number of offline computations are involved in training the image recognition model 402, the image recognition model local to the terminal device 200 may be transmitted to the terminal device after training by the service server 400.

It is to be understood that the method according to this embodiment of this application may be performed by a computer device. The computer device includes, but is not limited to, a terminal device or a server. The service server 100 in this embodiment of this disclosure may be the computer device, and the terminal device in the terminal device cluster may also be the computer device, which is not limited herein. The server may be an independent physical server, a server cluster or a distributed system composed of a plurality of physical servers, or a cloud server providing basic cloud computing services, such as a cloud service, a cloud database, cloud computing, a cloud function, cloud storage, a network service, cloud communication, a middleware service, a domain name service, a security service, a CDN, and big data and artificial intelligence platforms. The terminal device includes, but is not limited to, a mobile phone, a computer, an intelligent voice interaction device, an intelligent household appliance, and a vehicle-mounted terminal. This embodiment of this disclosure may be applied to various scenarios, including but not limited to a cloud technology, cloud security, blockchain, artificial intelligence, intelligent transportation, assisted driving, and the like.

It is to be understood that when this embodiment of this disclosure is applied to specific products or technologies, related data such as the image needs to be obtained after obtaining user permission or consent, and collection, use and processing of the relevant data is required to comply with relevant national and regional laws and regulations and standards.

In this embodiment of this disclosure, the image is described as a colorectal pathological image. But in a practical application scenario, the image may also be a pathological image of other cancer species or other multi-instance images including at least two sub-images. This application is not limited herein.

Figure 2:
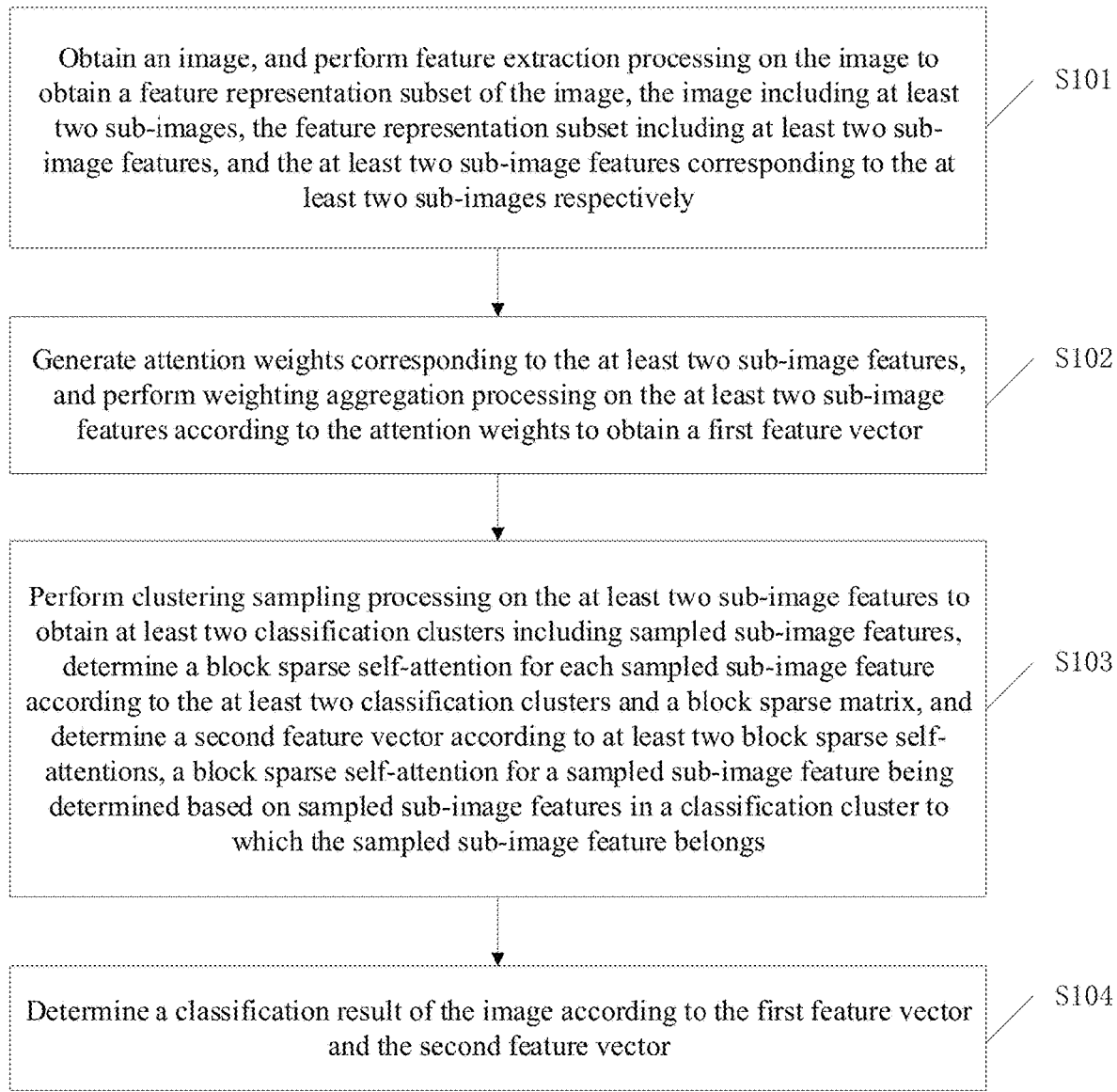
FIG. 2 is a schematic flowchart of an image detection method according to an embodiment of this disclosure.

Further, reference is made to FIG. 2. FIG. 2 is a schematic flowchart of an image detection method according to an embodiment of this disclosure. The image detection method may be performed by a computer device. The computer device may be the service server 100 shown in FIG. 1a, or any terminal device in the terminal device cluster shown in FIG. 1a, such as the terminal device 10c. The image detection method is described below by being performed by the computer device. The image detection method may include at least step S101 to step S104:

Step S101: Obtain an image, and perform feature extraction processing on the image to obtain a feature representation subset of the image. The image includes at least two sub-images. The feature representation subset includes at least two sub-image features, and the at least two sub-image features correspond to the at least two sub-images one to one.

Specifically, the image is a multi-instance image with weak image annotation and multiple instances corresponding to one label. A multi-instance image, also referred to as a multi-instance bag, includes several instances. An instance may be regarded as a sub-image, but only the bag contains labels, and the instance does not contain labels. If the multi-instance bag contains at least one positive instance, the bag is marked as a positive multi-instance bag (positive bag). If all instances of the multi-instance bag are negative instances, the bag is marked as a negative multi-instance bag (negative bag). The image may be a digital pathological image used in pathological diagnosis such as cancer diagnosis, survival prediction, and gene mutation prediction. The digital pathological image is detected to obtain a classification result of the digital pathological image. The classification result may assist a doctor in determining a corresponding medical diagnosis result. For example, the digital pathological image is the colorectal pathological image 301 in FIG. 1B, and the colorectal pathological image 301 is detected to obtain a classification result 405. The classification result 405 may assist object A in determining whether object B suffers from colorectal cancer.

Specifically, the image is media data used by human beings, and lacks information that may be understood by the computer device. Therefore, it is necessary to transform the image from an unstructured original image into structured information that may be recognized and processed by a computer, that is, to abstract the image scientifically, and to establish a mathematical model thereof to describe and replace the image, whereby the computer device can realize the recognition of the image by calculating and operating the mathematical model. The mathematical model may be a vector space model. At this moment, the sub-image features corresponding to the sub-images included in the image may be vectors in the vector space model. The computer device may describe and utilize the image through a feature representation subset composed of the sub-image features.

Specifically, if all the sub-image features are taken as feature items, it will lead to too much computation. Therefore, it is necessary to minimize the number of sub-images to be processed without damaging the core information of the image, so as to simplify the computation and improve the processing speed and efficiency of the image. Therefore, a feasible specific process of performing feature extraction processing on the image to obtain a feature representation subset of the image is: recognizing a background region and a foreground region in the image, then performing image segmentation on the image according to the background region and the foreground region to obtain a foreground image, and then scaling the foreground image according to a scaling magnification to obtain a scaled foreground image; and cropping the scaled foreground image according to a preset sub-image length and a preset sub-image width to obtain at least two sub-images, finally performing image feature extraction processing on the at least two sub-images to obtain sub-image features corresponding to the at least two sub-images, and determining the feature representation subset of the image according to the sub-image features corresponding to the at least two sub-images. The preset sub-image length is less than a length of the scaled foreground image. The preset sub-image width is less than a width of the scaled foreground image.

Figure 3:
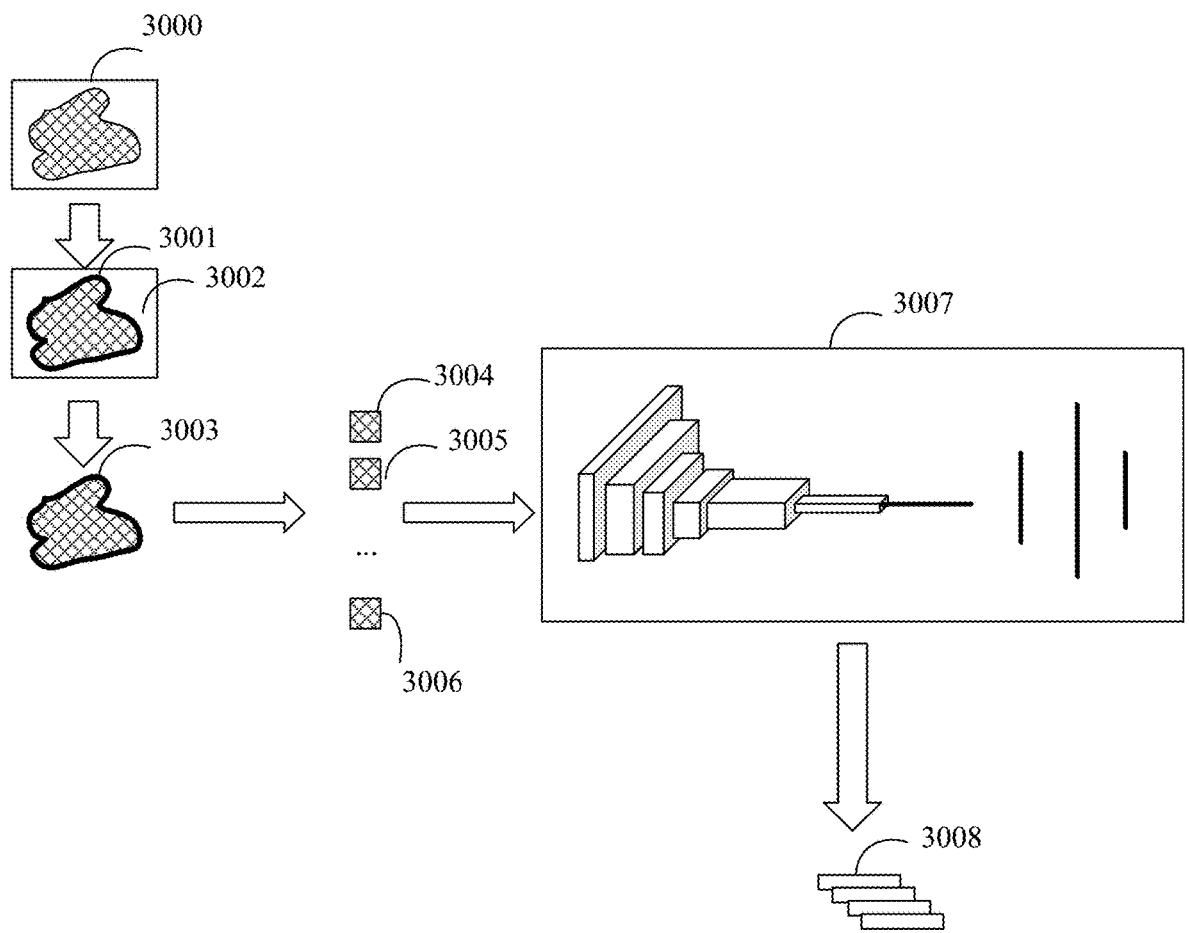
FIG. 3 is a schematic diagram of an image feature extraction processing scenario according to an embodiment of this disclosure.

For ease of understanding the feasible specific process of the feature extraction processing, reference is made to FIG. 3. FIG. 3 is a schematic diagram of an image feature extraction processing scenario according to an embodiment of this disclosure. As shown in FIG. 3, after obtaining an image 3000, the computer device may first perform foreground and background recognition on the image 3000, determine a foreground region 3001 and a background region 3002 included in the image 3000, and then perform image segmentation on the foreground and background regions to obtain a foreground image 3003. Then, the foreground image 3003 may be cropped according to a preset sub-image length and a preset sub-image width, for example, 512*512, to obtain at least two sub-images, that is, a sub-image 3004, a sub-image 3005, . . . , a sub-image 3006. Then, the at least two sub-images may be inputted to a feature extractor 3007, and sub-image features corresponding to each sub-image are extracted by the feature extractor 3007, thereby obtaining a feature representation subset 3008. The feature extractor 3007 may be implemented using a feature extractor RestNet50 (Residual net 50, a residual network) or other pre-training networks. This disclosure is not limited herein. In some implementations, the foreground image 3003 may be scaled at a set magnification. For example, the foreground image 3003 may be enlarged ten times to obtain a scaled foreground image. The scaled foreground image may be cropped to obtain more sub-images than the foreground image 3003. Therefore, more sub-image features may be obtained, and the image may be more finely represented.

Step S102: Generate attention weights corresponding to the at least two sub-image features, and perform weighting aggregation processing on the at least two sub-image features according to the attention weights to obtain a first feature vector.

Specifically, the attention weight may also be referred to as an attention score for measuring the importance of the sub-image features. As the attention weight is greater, the corresponding sub-image features are more important, and the proportion of the corresponding sub-image features in a finally outputted first feature vector is greater. The attention weight corresponding to each sub-image feature may be obtained by network learning with the attention weight as input.

Specifically, after the attention weight is obtained, the sub-image features may be subjected to weighting aggregation, that is, the sub-image features may be subjected to weighting aggregation according to the attention weight to obtain the first feature vector.

Step S103: Perform clustering sampling processing on the at least two sub-image features to obtain at least two classification clusters including sampled sub-image features, determine a block sparse self-attention corresponding to each sampled sub-image feature according to the at least two classification clusters and a block sparse matrix, and determine a second feature vector according to the at least two block sparse self-attentions. The block sparse self-attentions corresponding to the sampled sub-image features are determined based on the sampled sub-image features in the classification clusters to which the sampled sub-image features belong.

Specifically, in order to better mine the correlation between sub-image features and avoid excessive computational complexity, at least two sub-image features may be clustered first, that is, at least two sub-image features are divided into at least two classification clusters according to the similarity of sub-image features, and the sub-images corresponding to the sub-image features in one classification cluster belong to the same category. Then, some sub-image features are sampled from each classification cluster as sampled sub-image features.

Specifically, the self-attentions of the sampled sub-image features are determined based on the global self-attention weight matrix. The global self-attention weight matrix is used for characterizing the correlation between the sampled sub-image features. Since the sampled sub-image features have been classified previously, when determining a self-attention of a certain sampled sub-image feature, the computer device may only focus on sampled sub-image features belonging to the same classification cluster as the sampled sub-image feature. After determining the global self-attention weight matrix according to the sampled sub-image features, the computer device may obtain a block sparse matrix matched by at least two classification clusters, and filter the global self-attention weight matrix according to the block sparse matrix to obtain a block sparse global self-attention weight matrix. The block sparse global self-attention weight matrix is used for characterizing the correlation between the sampled sub-image features of the same classification cluster. Then, a block sparse self-attention of each sampled sub-image feature may be determined according to the block sparse global self-attention weight matrix, and the computer device may perform mean pooling processing on the block sparse self-attentions of all sampled sub-image features to obtain a second feature vector.

Step S104: Determine a classification result of the image according to the first feature vector and the second feature vector.

Specifically, after the first feature vector and the second feature vector are obtained, the first feature vector and the second feature vector may be predicted by using a multilayer perceptron (MLP), and a classification result is outputted.

With the method according to this embodiment of this disclosure, an image including at least two sub-images is subjected to feature extraction processing to obtain a feature representation subset of the image. The feature representation subset includes sub-image features corresponding to the at least two sub-images. Then information of the sub-images is mined in two manners. In the first manner, the information of each sub-image is independently mined. That is, attention weights corresponding to the at least two sub-image features are generated, and then weighting aggregation processing is performed on the at least two sub-image features according to the attention weights to obtain a first feature vector. In the second manner, relevant information between the sub-images of the same category is mined. That is, clustering sampling processing is performed on the at least two sub-image features to obtain at least two classification clusters each including sampled sub-image features. A block sparse self-attention corresponding to each sampled sub-image feature is determined according to the at least two classification clusters and a block sparse matrix. A second feature vector is determined according to the at least two block sparse self-attentions. Finally, a classification result of the image is determined according to the first feature vector and the second feature vector. The first feature vector and the second feature vector obtained by the two information mining manners may complement and constrain each other. Therefore, the detection accuracy of images may be improved. In addition, a block sparse self-attention corresponding to a sampled sub-image feature may be calculated by the block sparse matrix, thereby only paying attention to the correlation between sampled sub-image features belonging to the same classification cluster with the sampled sub-image feature, reducing the computational complexity, and improving the detection speed.

Figure 4:
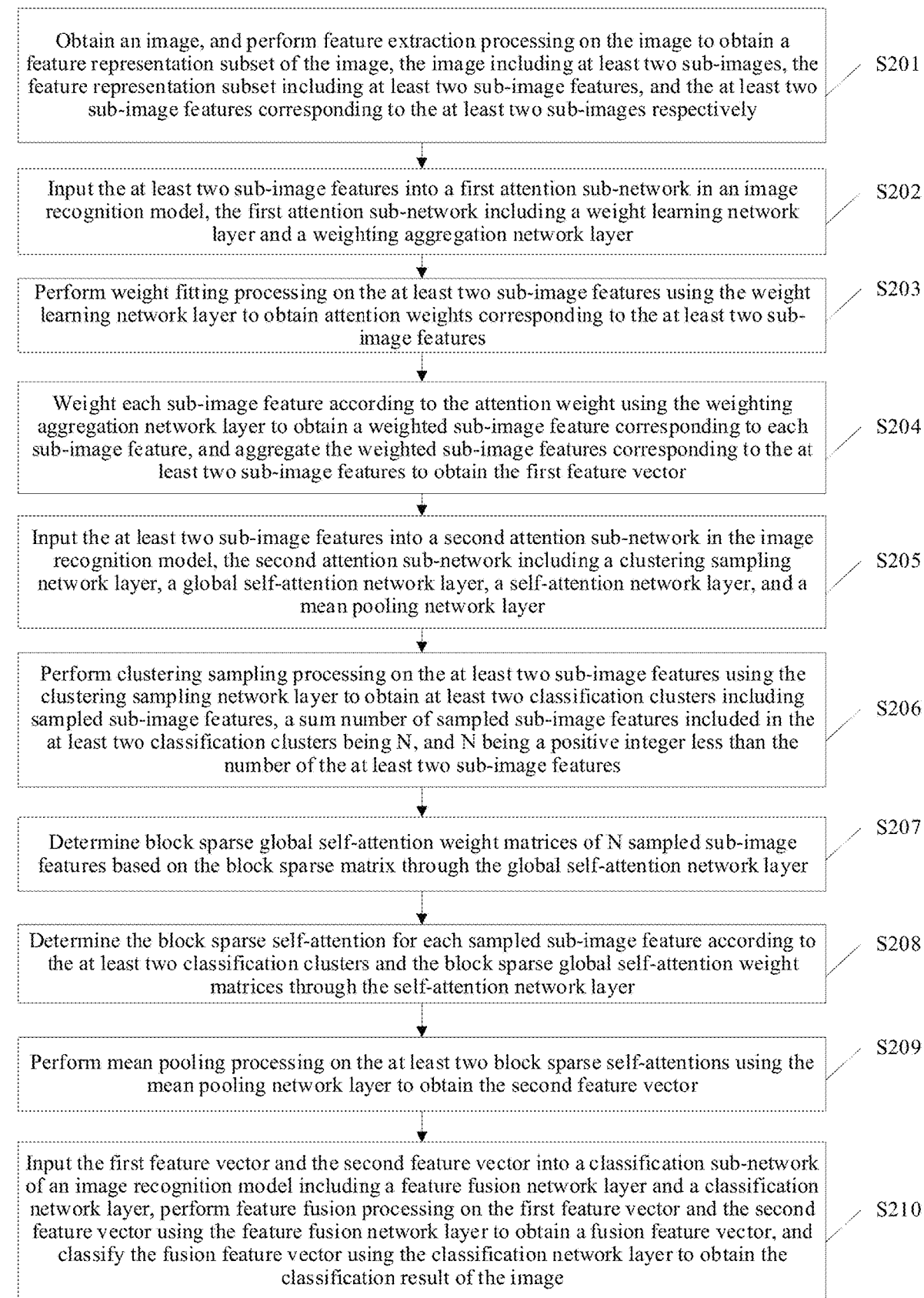
FIG. 4 is a schematic flowchart of an image detection method according to an embodiment of this disclosure.

Further, reference is made to FIG. 4. FIG. 4 is a schematic flowchart of an image detection method according to an embodiment of this disclosure. The image detection method may be performed by a computer device. The computer device may be the service server 100 shown in FIG. 1a, or any terminal device in the terminal device cluster shown in FIG. 1a, such as the terminal device 10c. The image detection method is described below by being performed by the computer device. The image detection method may include at least step S201 to step S210:

Step S201: Obtain an image, and perform feature extraction processing on the image to obtain a feature representation subset of the image. The image includes at least two sub-images. The feature representation subset includes at least two sub-image features, and the at least two sub-image features correspond to the at least two sub-images one to one.

Specifically, for the implementation of step S201, reference may be made to the specific description of step S101 in the embodiment corresponding to FIG. 2.

Specifically, assuming that the image is X, at least two sub-images are obtained after the tissue background segmentation and picture cropping, and an image set composed of the at least two sub-images may be represented as $\{x_1, x_2, \ldots, x_n\}$, where each sub-image $x_i$ is referred to as an instance of the image. The process of performing feature extraction processing on the at least two sub-images may be represented by the following formula (1):

$$H=\{h_1,h_2,\ldots,h_n\}=Ff\{x_1,x2,\ldots,x_n\} \qquad \text{Formula (1)}$$

where H is the feature representation subset, $h_i \in R1 \times d$, d=1024 by default, and i is a positive integer less than or equal to n. Ff represents the feature extraction processing, which is usually determined based on the selected feature extractor.

Step S202: Input the at least two sub-image features into a first attention sub-network in an image recognition model. The first attention sub-network includes a weight learning network layer and a weighting aggregation network layer.

Step S203: Perform weight fitting processing on the at least two sub-image features through the weight learning network layer to obtain attention weights corresponding to the at least two sub-image features.

Specifically, the weight learning network layer may adopt a parametric neural network to learn the attention weights corresponding to the sub-image features. The attention weight a k corresponding to the sub-image feature $h_k$ in the feature representation subset H obtained by formula (1) may be represented as formula (2):

$$a_k = \frac{\exp\{W^\top \tanh(Vh_k^\top)\}}{\sum_{j=1}^{K} \exp\{W^\top \tanh(Vh_j^\top)\}} \qquad \text{Formula (2)}$$

where W and V are parameter matrices, and tanh is a nonlinear function. From formula (2), it can be seen that the attention weight $a_k$ is only related to the sub-image feature hk and unrelated to other sub-image features. In other words, the weight learning network layer assumes that the feature representation subset H is independently distributed.

Step S204: Weight each sub-image feature according to the attention weight through the weighting aggregation network layer to obtain a weighted sub-image feature corresponding to each sub-image feature, and aggregate the weighted sub-image features corresponding to the at least two sub-image features to obtain the first feature vector.

Specifically, in the weighting aggregation network layer, the sub-image features may be effectively aggregated by sampling primary-item non-linear attention weighting, that is, it may be calculated by formula (3):

$$X_1 = \Sigma_{k=1}^{n} a_k h_k \qquad \text{Formula (3)}$$

where $X_1$ is the first feature vector, n is the number of sub-image features included in the feature representation subset H, $h_k$ is a $k^{th}$ sub-image feature in the feature representation subset H, and a k is the attention weight corresponding to the $k^{th}$ sub-image feature in the feature representation subset H.

Step S205: Input the at least two sub-image features into a second attention sub-network in the image recognition model. The second attention sub-network includes a clustering sampling network layer, a global self-attention network layer, a self-attention network layer, and a mean pooling network layer.

Specifically, the at least two sub-image features are inputted into the first attention sub-network and the second attention sub-network simultaneously, and the first attention sub-network and the second attention sub-network do not affect each other.

Step S206: Perform clustering sampling processing on the at least two sub-image features through the clustering sampling network layer to obtain at least two classification clusters including sampled sub-image features. The sum of the numbers of sampled sub-image features included in the at least two classification clusters is N, and N is a positive integer less than the number of the at least two sub-image features.

Specifically, in the clustering sampling network layer, the computer device may first cluster at least two sub-image features to obtain at least two classification clusters, and then obtain a $k^{th}$ classification cluster among the at least two classification clusters, where k is a positive integer, and the $k^{th}$ classification cluster includes at least one clustered sub-image feature. Then the computer device may obtain a vector distance between the at least one clustered sub-image feature and a cluster center of the $k^{th}$ classification cluster as a reference distance. h clustered sub-image features are sequentially obtained from the at least one clustered sub-image feature according to the reference distance, and the h clustered sub-image features are taken as the sampled sub-image features included in the $k^{th}$ classification cluster, where h is a positive integer, and h is less than or equal to the number of the at least one clustered sub-image feature.

It is to be understood that assuming that the number of classification clusters obtained by clustering at least two sub-image features is p and each classification cluster has a cluster center, when sampling each classification cluster, h sub-image features closest to the cluster center of the classification cluster may be acquired, and N sampled sub-image features may be obtained finally, where N=p×h. In order to reduce the computational complexity, the total number of samples is generally N=128 by default. After clustering and sampling, the N sampled sub-image features have diversity, and may be approximated as effective representatives of the original at least two sub-image features.

Figure 5:
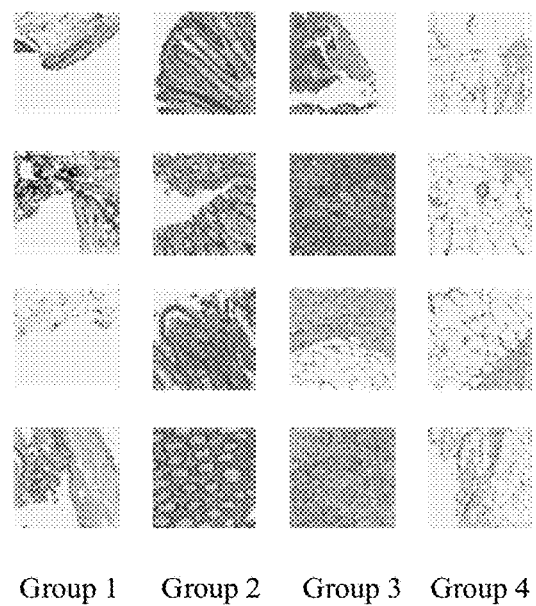
FIG. 5 is a schematic diagram of a clustering result of a colorectal pathological image according to an embodiment of this disclosure.

Specifically, the clustering processing may adopt unsupervised k-means (an unsupervised clustering method) clustering method or other clustering methods, which is not limited herein. In the at least two classification clusters obtained after clustering, the sub-images corresponding to the sub-image features included in each classification cluster belong to the same image category. For ease of understanding, reference is made to FIG. 5. FIG. 5 is a schematic diagram of a clustering result of a colorectal pathological image according to an embodiment of this disclosure. As shown in FIG. 5, the sub-image features corresponding to the same group of sub-images belong to the same classification cluster. From FIG. 5, it can be found that different pathological images may be roughly divided into categories with similar histological structural features. For example, the sub-images in group 1 contain obvious cancerous tissue. The sub-images in group 2 are all sub-images with abnormal staining or poor imaging quality. The sub-images in group 3 basically contain glandular tissue. The sub-images in group 4 all gather more immune cells and so on.

Step S207: Determine block sparse global self-attention weight matrices of N sampled sub-image features based on the block sparse matrix through the global self-attention network layer.

Specifically, the second attention sub-network includes a query weight matrix and a key weight matrix. The process of determining, by the computer device, block sparse global self-attention weight matrices of N sampled sub-image features based on the block sparse matrix through the global self-attention network layer may be: constructing a sampled sub-image feature matrix according to the sampled sub-image features included in the at least two classification clusters through the global self-attention network layer; multiplying the sampled sub-image feature matrix and the query weight matrix to obtain a query matrix, and multiplying the sampled sub-image feature matrix and the key weight matrix to obtain a key matrix; determining a block sparse global correlation matrix according to the query matrix, a transposition matrix corresponding to the key matrix, and the block sparse matrix; and normalizing the block sparse global correlation matrix to obtain the block sparse global self-attention weight matrix.

Specifically, the sampled sub-image feature matrix may be represented as formula (4):

$$\tilde{H} = \{\tilde{h}_1, \tilde{h}_2, \ldots, \tilde{h}_N\} \qquad \text{Formula (4)}$$

where $\tilde{H}$ is the sampled sub-image feature matrix, $\tilde{h}_i$ is an $i^{th}$ sampled sub-image feature in the sampled sub-image feature matrix $\tilde{H}$, i is a positive integer less than or equal to N, and N is 128 mentioned above.

Specifically, the calculation of the query matrix may be represented by formula (5):

$$Q = \tilde{H} \times W_q = [q_1, q_2, \ldots, q_N] \qquad \text{Formula (5)}$$

where $W_q$ is the query weight matrix, which is a matrix randomly initialized by the second attention sub-network, $\tilde{H}$ is the sampled sub-image feature matrix, Q is the query matrix, and $q_i$ is a query vector associated with the $i^{th}$ sampled sub-image feature in the sampled sub-image feature matrix $\tilde{H}$.

Similarly, the calculation of the key matrix may be represented by formula (6):

$$K = \tilde{H} \cdot W_k = [k_1, k_2, \ldots, k_N] \qquad \text{Formula (6)}$$

where $W_k$ is the key weight matrix, which is also a matrix randomly initialized by the second attention sub-network, $\tilde{H}$ is the sampled sub-image feature matrix, K is the key matrix, and $k_i$ is a key vector associated with the $i^{th}$ sampled sub-image feature in the sampled sub-image feature matrix $\tilde{H}$.

Therefore, the calculation of the block sparse global self-attention weight matrix may be represented by formula (7):

$$A = \text{softmax}\left(\frac{QK^T}{\sqrt{d_k}}B\right) \quad \text{Formula (7)}$$

where Q is the query matrix, $K^T$ is the transposition matrix of the key matrix, B is the block sparse matrix related to at least two classification clusters, $d_k$ is N, the function of softmax is normalization, and A is the block sparse global self-attention weight matrix.

Figure 6:
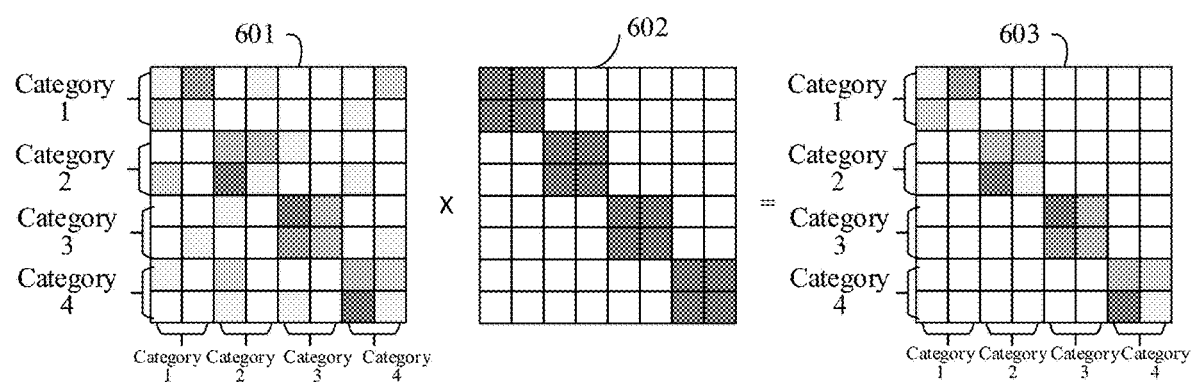
FIG. 6 is a schematic diagram of a principle of performing block sparse constraint on a global self-attention according to an embodiment of this disclosure.

For ease of understanding, reference is made to FIG. 6. FIG. 6 is a schematic diagram of a principle of performing block sparse constraint on a global self-attention according to an embodiment of this disclosure. As shown in FIG. 6, a global self-attention weight matrix 601 is a global self-attention matrix when it is not constrained. At this moment, information between sampled sub-image features of different categories is also represented. The computer device may obtain a block sparse matrix 602 and constrain the block sparse matrix to obtain a constrained block sparse global self-attention weight matrix 603. From FIG. 6, it can be seen that the block sparse global self-attention weight matrix 603 only represents the information between sampled sub-image features of the same category. In essence, block sparse constraint uses the correlation of categories to filter the global self-attention, thus only paying attention to and retaining the attention of the same category, and removing the attentions of different categories. With respect to the global self-attention weight matrix 601, the block sparse global self-attention weight matrix 603 learns the attention using category information of instances and makes appropriate simplified calculations.

Step S208: Determine the block sparse self-attention corresponding to each sampled sub-image feature according to the at least two classification clusters and the block sparse global self-attention weight matrices through the self-attention network layer.

Specifically, the second attention sub-network further includes a value weight matrix. The N sampled sub-image features include a sampled sub-image feature Na, where a is a positive integer less than or equal to N. The computer device multiplies the sampled sub-image feature matrix and the value weight matrix through the self-attention network layer to obtain a value matrix. The sampled sub-image feature in the classification cluster to which the sampled sub-image feature Na belongs is taken as a target sampled sub-image feature. A block sparse global self-attention weight between the sampled sub-image feature Na and the target sampled sub-image feature is obtained from the block sparse global self-attention weight matrix as a target block sparse global self-attention weight. A value vector corresponding to the target sampled sub-image feature is obtained from the value matrix as a target value vector. The block sparse self-attention corresponding to the sampled sub-image feature Na is determined according to the target value vector and the target block sparse global self-attention weight. The sampled sub-image feature Na is an $a^{th}$ sampled sub-image feature in the sampled sub-image feature matrix $\tilde{H}$.

Specifically, the calculation of the value matrix may be represented by formula (8):

$$V = \tilde{H} \cdot W_v = [v_1, v_2, \ldots, v_n] \quad \text{Formula (8)}$$

where $W_v$ is the value weight matrix, which is a matrix randomly initialized by the second attention sub-network, $\tilde{H}$ is the sampled sub-image feature matrix, V is the value matrix, and $v_i$ is a value vector associated with the $i^{th}$ sampled sub-image feature in the sampled sub-image feature matrix $\tilde{H}$.

The calculation of the block sparse self-attention may be represented by formula (9):

$$z_a = \Sigma_{b:\tilde{h}_b \in \mu(\tilde{h}_a)} A_{ab} v_b \quad \text{Formula (9)}$$

where $z_a$ refers to the block sparse self-attention corresponding to the sampled sub-image feature Na, $\tilde{h}_a$ is an $a^{th}$ sampled sub-image feature in the sampled sub-image feature matrix $\tilde{H}$, that is, the sampled sub-image feature Na, $\tilde{h}_b$ is a $b^{th}$ sampled sub-image feature in the sampled sub-image feature matrix $\tilde{H}$, and both a and b are positive integers less than or equal to N. $\mu(\tilde{h}_a)$ refers to a cluster center of the classification cluster to which $\tilde{h}_a$ belongs, and $\tilde{h}_b \in \mu(\tilde{h}_a)$ represents that $\tilde{h}_b$ belongs to the classification cluster corresponding to the cluster center. $b:\tilde{h}_b \in \mu(\tilde{h}_a)$ is a constraint condition, that is, b is traversed from 1 to N, and $A_{ab} v_b$ is accumulated only if $\tilde{h}_a$ and $\tilde{h}_b$ belong to the same classification cluster. $v_b$ is the value vector associated with $\tilde{h}_b$ in the value matrix. $A_{ab}$ is the block sparse global self-attention weight in row a and column b of the block sparse global self-attention weight matrix, that is, the block sparse global self-attention weight between $\tilde{h}_a$ and $\tilde{h}_b$.

Step S209: Perform mean pooling processing on the at least two block sparse self-attentions through the mean pooling network layer to obtain the second feature vector.

Specifically, the mean pooling processing refers to adding at least two block sparse self-attentions and then averaging to obtain the second feature vector $X_2$.

Step S210: Input the first feature vector and the second feature vector into a classification sub-network of an image recognition model including a feature fusion network layer and a classification network layer, perform feature fusion processing on the first feature vector and the second feature vector through the feature fusion network layer to obtain a fusion feature vector, and classify the fusion feature vector through the classification network layer to obtain the classification result of the image.

Specifically, the first attention sub-network outputs the first feature vector $X_1$, the second attention sub-network outputs the second feature vector $X_2$, and the two parallel feature vectors are subjected to feature fusion in the feature fusion network layer. The classification network layer may adopt an MLP classifier, and therefore the final output may be represented as the following formula (10):

$$y = MLP(\text{concate}(X_1, X_2)) \quad \text{Formula (10)}$$

where Concate represents the feature fusion operation, and the commonly used feature fusion methods are feature mosaic and weighting summation. The final output is y, which may be a normal prediction probability for the image. When the normal prediction probability is lower than a certain threshold, the image may be determined as an abnormal image.

Figure 7:
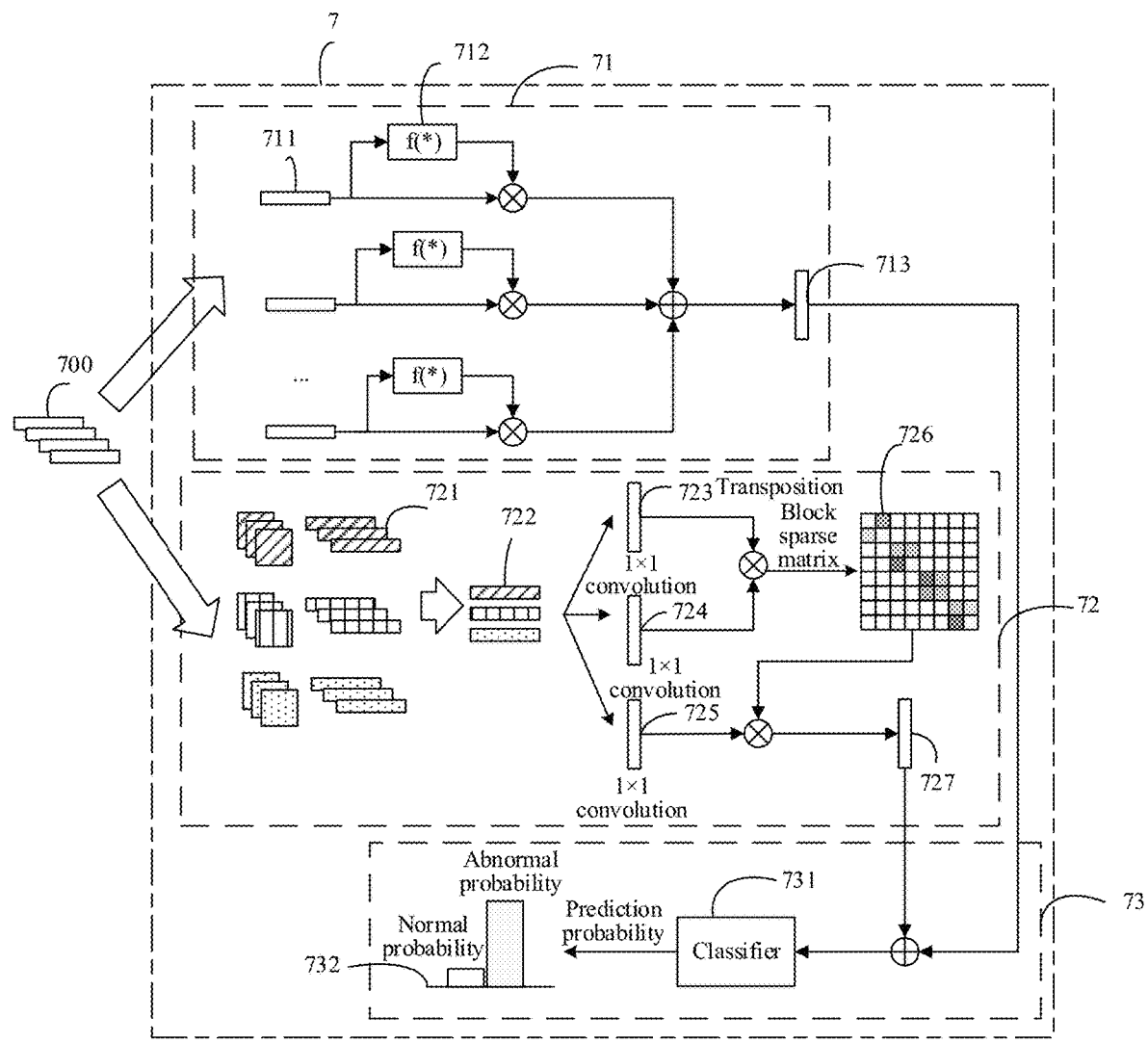
FIG. 7 is a schematic structural diagram of an image recognition model according to an embodiment of this disclosure.

For ease of understanding the structure of the image recognition model in step S202 to step S210, reference is made to FIG. 7. FIG. 7 is a schematic structural diagram of an image recognition model according to an embodiment of this disclosure. As shown in FIG. 7, the image recognition model 7 includes a first attention sub-network 71, a second attention sub-network 72, and a classification sub-network 73. After obtaining a feature representation subset 700 corresponding to the image, the computer device sequentially inputs sub-image features in the feature representation subset 700 into the image recognition model 7. The feature representation subset 700 includes at least two sub-image features. In the image recognition model 7, the computer device inputs the feature representation subset 700 into the first attention sub-network 71 and the second attention sub-network 72, respectively. In the first attention sub-network 71, a weight corresponding to each sub-image feature in the feature representation subset 700 is learned through a parametric neural network. For example, a sub-image feature 711 may be inputted into a parametric neural network 712, and the neural network 712 outputs the weight of the sub-image feature 711. For the specific implementation, reference may be made to step S203. Then, in the first attention sub-network 71, the computer device may effectively aggregate all the sub-image features in the feature representation subset 700 by primary-item non-linear attention weighting to finally obtain a first feature vector 713. For the aggregation process, reference may be made to step S204. In the second attention sub-network 72, the computer device first performs unsupervised clustering on the feature representation subset 700 to obtain at least two classification clusters, such as a classification cluster 721, and sub-images corresponding to sub-image features in the classification cluster 721 belong to the same category of images. Then, the computer device obtains some sub-image features from each classification cluster as sampled sub-image features. For the clustering and sampling processing, reference may be made to step S206. Then, in the second attention sub-network 72, the computer device may transform a sampled sub-image feature matrix 722 formed by the sampled sub-image features into a key matrix 723, a query matrix 724, and a value matrix 725. For the matrix transformation, reference may be made to the above formulas (5), (6), and (8), and the matrix transformation may be realized by a convolution network with a convolution kernel of 1×1. Then, in the second attention sub-network 72, a block sparse global self-attention matrix 726 may be determined according to a transposition matrix, the query matrix 724, and a block sparse matrix of the key matrix 723. For the determination process, reference may be made to step S207. A second feature vector 727 is further determined according to the block sparse global attention matrix 726 and the value matrix 725. For the determination process, reference may be made to step S208 and step S209. Finally, the computer device inputs the first feature vector 713 and the second feature vector 727 into the classification sub-network 73. In the classification sub-network 73, after feature fusion of the first feature vector 713 and the second feature vector 727, a feature-fused vector is inputted into a classifier 731, and then a classification result 732 is outputted. The classification result 732 may include an image normal probability and an image abnormal probability.

With the method according to this embodiment of this disclosure, the first attention sub-network and the second attention sub-network in the image recognition model mine the information of the image through two different ways to obtain the first feature vector and the second feature vector. The two fused feature vectors may complement and constrain each other and are predicted, and the accuracy of the obtained classification result is high.

Figure 8:
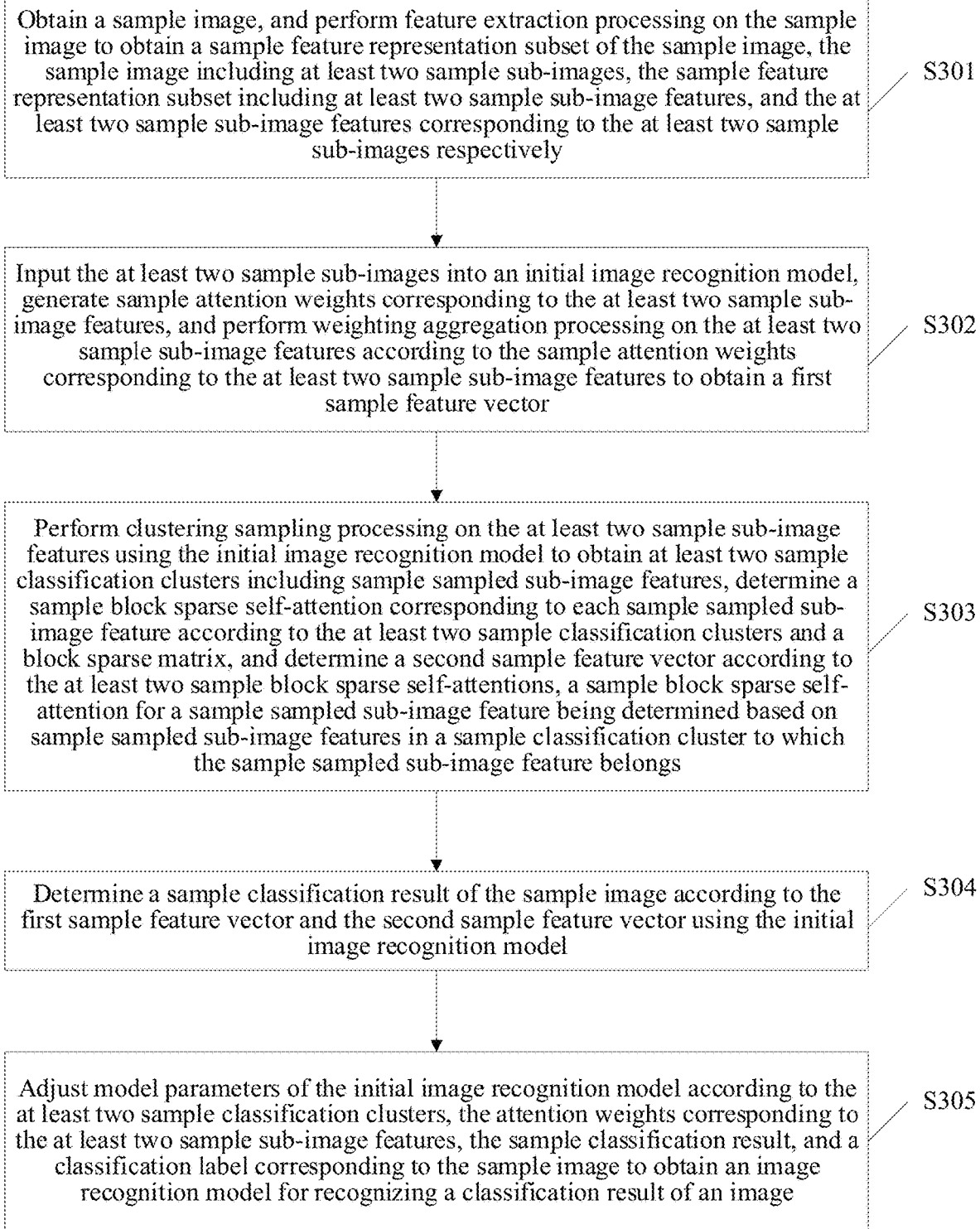
FIG. 8 is a schematic flowchart of a method for training an initial image recognition model according to an embodiment of this disclosure.

Further, reference is made to FIG. 8. FIG. 8 is a schematic flowchart of a method for training an initial image recognition model according to an embodiment of this disclosure. The method for training an initial image recognition model may be performed by a computer device. The computer device may be the service server 100 shown in FIG. 1a, or any terminal device in the terminal device cluster shown in FIG. 1a, such as the terminal device 10c. The method for training an initial image recognition model is described below by being performed by the computer device. The method for training an initial image recognition model may include at least step S301 to step S305:

Step S301: Obtain a sample image, and perform feature extraction processing on the sample image to obtain a sample feature representation subset of the sample image. The sample image includes at least two sample sub-images. The sample feature representation subset includes at least two sample sub-image features, and the at least two sample sub-image features correspond to the at least two sample sub-images one to one.

Specifically, for the implementation process of step S301, reference may be made to the description of step S101 in the embodiment corresponding to FIG. 2.

Step S302: Input the at least two sample sub-images into an initial image recognition model, generate sample attention weights corresponding to the at least two sample sub-image features through the initial image recognition model, and perform weighting aggregation processing on the at least two sample sub-image features according to the sample attention weights corresponding to the at least two sample sub-image features to obtain a first sample feature vector.

Specifically, the initial image recognition model may include a first initial attention sub-network. The computer device may generate sample attention weights corresponding to at least two sample sub-image features through the first initial attention sub-network, and perform weighting aggregation processing on the at least two sample sub-image features according to the sample attention weights corresponding to the at least two sample sub-image features to obtain a first sample feature vector. For the specific implementation process, reference may be made to the description of step S202 to step S204 in the embodiment corresponding to FIG. 4.

Step S303: Perform clustering sampling processing on the at least two sample sub-image features through the initial image recognition model to obtain at least two sample classification clusters including sample sampled sub-image features, determine a sample block sparse self-attention corresponding to each sample sampled sub-image feature according to the at least two sample classification clusters and a block sparse matrix, and determine a second sample feature vector according to the at least two sample block sparse self-attentions. The sample block sparse self-attentions corresponding to the sample sampled sub-image features are determined based on the sample sampled sub-image features in the sample classification clusters to which the sample sampled sub-image features belong.

Specifically, the initial image recognition model may further include a second initial attention sub-network. Then clustering sampling processing is performed on the at least two sample sub-image features through the second initial attention sub-network to obtain sample sampled sub-image features included in at least two sample classification clusters, a sample block sparse self-attention corresponding to each sample sampled sub-image feature is determined according to the at least two sample classification clusters and a block sparse matrix, and a second sample feature vector is determined according to the at least two sample block sparse self-attentions. For the specific implementation process, reference may be made to the description of step S205 to step S209 in the embodiment corresponding to FIG. 4.

Step S304: Determine a sample classification result of the sample image according to the first sample feature vector and the second sample feature vector through the initial image recognition model.

Specifically, the initial image recognition model may further include an initial classification sub-network. Then a sample classification result of the sample image is determined according to the first sample feature vector and the second sample feature vector through the initial classification sub-network. For the specific implementation, reference may be made to the description of step S210 in the embodiment corresponding to FIG. 4.

Step S305: Adjust model parameters of the initial image recognition model according to the at least two sample classification clusters, the attention weights corresponding to the at least two sample sub-image features, the sample classification result, and a classification label corresponding to the sample image to obtain an image recognition model for recognizing a classification result of an image.

Specifically, the inputs of the first attention sub-network and the second attention sub-network in the finally obtained image recognition model are the same sub-image features. Therefore, the attention distribution of the first attention sub-network to at least two sub-image features and the attention distribution of the second attention sub-network to at least two sub-image features shall be consistent. Therefore, in the process of training the initial image recognition model, the computer device may first determine a divergence loss value according to at least two sample classification clusters and the sample attention weights corresponding to the at least two sample sub-image features. Then a classification loss value is determined according to the sample classification result and the classification label corresponding to the sample image. Finally, weighting summation is performed on the divergence loss value and the classification loss value to obtain a total model loss value. The model parameters of the initial image recognition model are adjusted according to the total model loss value to obtain the image recognition model. The divergence loss value is used for ensuring that the attention distributions of the two network branches of the finally trained image recognition model to the same sub-image feature input are consistent. The classification loss value is used for ensuring that the classification result of the finally trained image recognition model may be closer to the real result.

Specifically, the implementation process of determining a divergence loss value according to the at least two sample classification clusters and the sample attention weights corresponding to the at least two sample sub-image features may be: obtaining an $i^{th}$ sample classification cluster from the at least two sample classification clusters, where i is a positive integer, and i is less than or equal to the number of the at least two sample classification clusters; taking sample sub-image features included in the $i^{th}$ sample classification cluster as target sample sub-image features; determining a category divergence loss value corresponding to the $i^{th}$ sample classification cluster according to sample attention weights corresponding to the target sample sub-image features and the number of the target sample sub-image features; and accumulating the category divergence loss values corresponding to the sample classification clusters to obtain the divergence loss value.

Since the computer device clusters the sample sub-image features included in the sample image in the second initial attention sub-network when performing image detection on the sample image to obtain at least two sample classification clusters, the attention degree of the sample sub-image features in the same sample classification cluster is the same in the second initial attention sub-network, the attention degree of the sample sub-image features in the same sample classification cluster shall also be the same in the first initial attention sub-network. For example, the sample image includes six sample sub-image features, that is, B1, B2, B3, B4, B5, and B6. The sample attention weights generated in the first initial attention sub-network are 0.10, 0.22, 0.11, 0.31, 0.22, and 0.12 in turn, and the sample classification clusters generated in the second initial attention sub-network are: sample classification cluster 1 {B1, B3, B6} and sample classification cluster 2 {B2, B4, B5}. It can be seen that the sample attention weights corresponding to B1, B3, and B4 in sample classification cluster 1 are close to the same, which is reasonable. However, the attention weight of B4 in sample classification cluster 2 is obviously higher than that of B2 and B5, which is unreasonable. Therefore, the adjustment needs to be performed through the divergence loss value. That is, the attention weights generated by the sample sub-image features in the same sample classification cluster in the first attention sub-network shall obey uniform distribution. Therefore, each sample classification cluster may determine a category divergence loss value. Then, the category divergence loss values corresponding to the sample classification clusters are accumulated to obtain the divergence loss value.

Specifically, the implementation process of determining a category divergence loss value corresponding to the $i^{th}$ sample classification cluster according to sample attention weights corresponding to the target sample sub-image features and the number of the target sample sub-image features may be: obtaining a fitting attention distribution composed of sample attention weights corresponding to the target sample sub-image features; normalize the fitting attention weight distribution to obtain a normalized fitting attention distribution; take a uniform attention distribution corresponding to the number of the target sample sub-image features as an attention distribution label; and determine the category divergence loss value corresponding to the $i^{th}$ sample classification cluster according to the normalized fitting attention distribution and the attention distribution label.

Assuming that the sample attention weights corresponding to the target sample sub-image features are 0.10, 0.12, and 0.11, a fitting attention distribution is [0.10, 0.12, 0.11]. In order that the probability is required to be inputted in the subsequent calculation of the category divergence loss value, the fitting attention distribution needs to be normalized, that is, the sum is 1, and the normalized fitting attention distribution is [0.303, 0.363, 0.333]. If the number of the target sample sub-image features is 3, the corresponding uniform attention distribution is taken as an attention distribution label: [⅓, ⅓, ⅓].

The process of determining the category divergence loss value corresponding to the $i^{th}$ sample classification cluster according to the normalized fitting attention distribution and the attention distribution label may be represented by the following formula (11):

$$D_{KL}(P\|D) = \Sigma_{i=1}^{G}[p(x_i)\log d(x_i) - p(x_i)\log d(x_i)]$$ Formula (11)

where G is the number of the target sample sub-image features, $p(x_i)$ is an $i^{th}$ value in the attention distribution label, and $d(x_i)$ is an $i^{th}$ value in the normalized fitting attention distribution. $D_{KL}(P\|D)$ is the category divergence loss value.

Therefore, the calculation of the divergence loss value may be realized by the following formula (12):

$$KL = \Sigma_{i=1}^{c} D_{KL}(U\|D_i) \quad \text{Formula (12)}$$

where c is the number of the sample classification clusters in the at least two sample classification clusters, and $D_{KL}(U\|D_i)$ refers to the category divergence loss value of an $i^{th}$ sample classification cluster in the at least two sample classification clusters. KL is the divergence loss value.

Specifically, the determination of the total loss value may be realized by the following formula (13):

$$\text{Loss} = CE(y,y') + \alpha * KL \quad \text{Formula (13)}$$

where y represents the classification label corresponding to the sample image. y' represents the sample classification result outputted by the initial classification sub-network, KL is the divergence loss value, and a represents the weight which is 0.01 by default.

Specifically, when the initial image recognition model is trained, 100 epoch (period) may be trained. Adam (an optimization algorithm) is adopted by default as an optimizer. An initial learning rate is 1e-4. A cosine annealing strategy is used for adjusting the learning rate. A minimum learning rate is 1e-6.

With the method according to this embodiment of this disclosure, when training the initial image recognition model, the attention distributions of the first initial attention sub-network and the second initial attention sub-network are additionally constrained. That is, the K-L divergence loss function is added in the loss function to ensure that the attention distributions of the same multiple instances inputted to the two sub-networks are consistent, and the image detection accuracy of the finally trained image recognition model is high.

Figure 9:
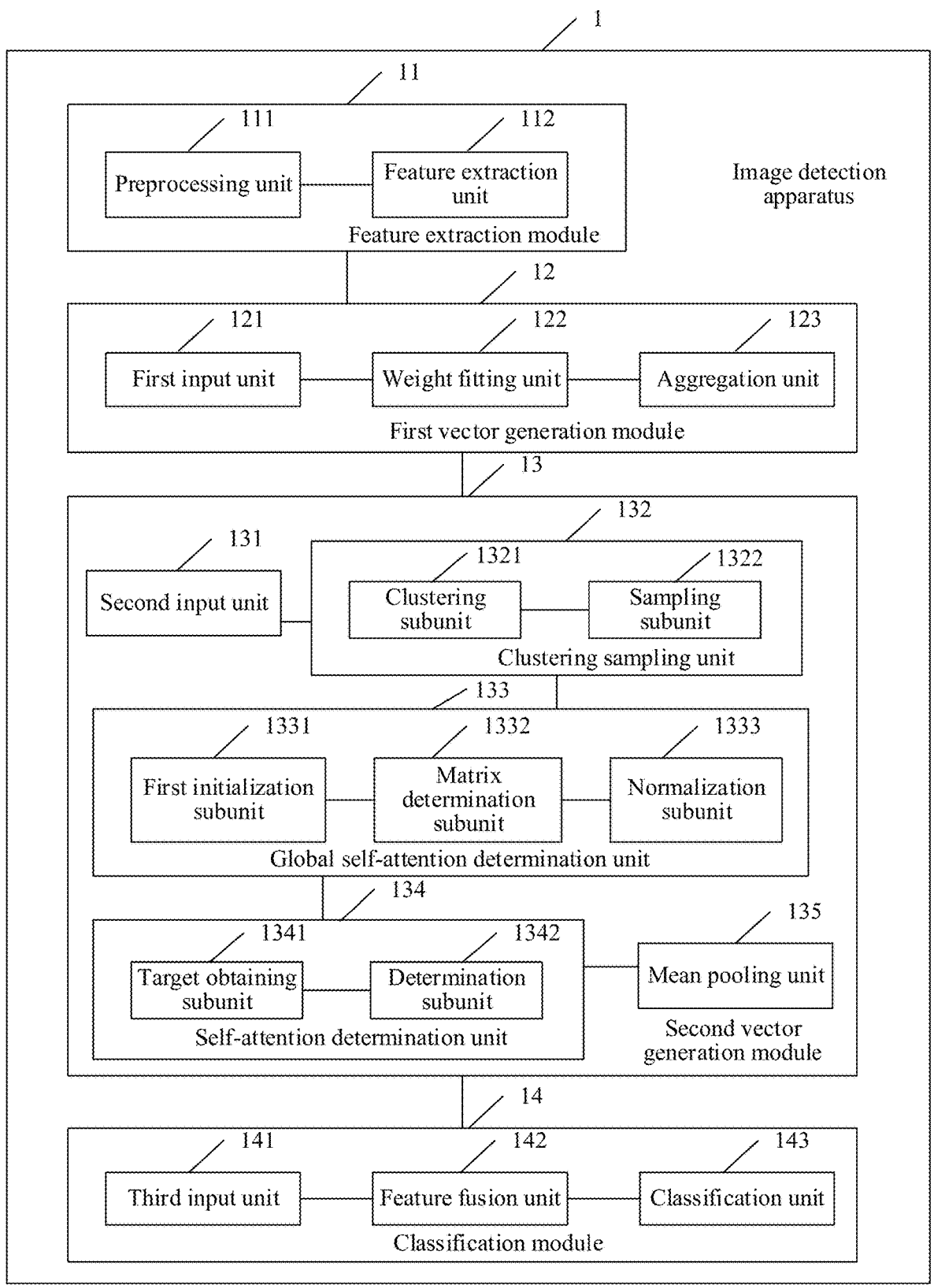
FIG. 9 is a schematic structural diagram of an image detection apparatus according to an embodiment of this disclosure.

Reference is made to FIG. 9. FIG. 9 is a schematic structural diagram of an image detection apparatus according to an embodiment of this disclosure. The image detection apparatus may be a computer program (including program codes) running in a computer device. For example, the image detection apparatus is application software. The apparatus may be configured to perform corresponding steps in the image detection method according to this embodiment of this disclosure. As shown in FIG. 9, the image detection apparatus 1 may include: a feature extraction module 11, a first vector generation module 12, a second vector generation module 13, and a classification module 14.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

The feature extraction module 11 is configured to obtain an image, and perform feature extraction processing on the image to obtain a feature representation subset of the image. The image includes at least two sub-images. The feature representation subset includes at least two sub-image features, and the at least two sub-image features correspond to the at least two sub-images one to one.

The first vector generation module 12 is configured to generate attention weights corresponding to the at least two sub-image features, and perform weighting aggregation processing on the at least two sub-image features according to the attention weights to obtain a first feature vector.

The second vector generation module 13 is configured to perform clustering sampling processing on the at least two sub-image features to obtain at least two classification clusters including sampled sub-image features, determine a block sparse self-attention corresponding to each sampled sub-image feature according to the at least two classification clusters and a block sparse matrix, and determine a second feature vector according to the at least two block sparse self-attentions. The block sparse self-attentions corresponding to the sampled sub-image features are determined based on the sampled sub-image features in the classification clusters to which the sampled sub-image features belong.

The classification module 14 is configured to determine a classification result of the image according to the first feature vector and the second feature vector.

For specific implementations of the feature extraction module 11, the first vector generation module 12, the second vector generation module 13, and the classification module 14, reference may be made to the relevant description of the embodiment corresponding to FIG. 2.

The feature extraction module 11 includes: a preprocessing unit 111 and a feature extraction unit 112.

The preprocessing unit 111 is configured to recognize a background region and a foreground region in the image.

The preprocessing unit 111 is further configured to perform image segmentation on the image according to the background region and the foreground region to obtain a foreground image.

The preprocessing unit 111 is further configured to scale the foreground image according to a scaling magnification to obtain a scaled foreground image.

The preprocessing unit 111 is further configured to crop the scaled foreground image according to a preset sub-image length and a preset sub-image width to obtain the at least two sub-images. The preset sub-image length is less than a length of the scaled foreground image. The preset sub-image width is less than a width of the scaled foreground image.

The feature extraction unit 112 is configured to perform image feature extraction processing on the at least two sub-images to obtain sub-image features corresponding to the at least two sub-images, and determine a feature representation subset of the image according to the sub-image features corresponding to the at least two sub-images.

For specific implementations of the preprocessing unit 111 and the feature extraction unit 112, reference may be made to the relevant description of the embodiment corresponding to FIG. 2.

The first vector generation module 12 includes: a first input unit 121, a weight fitting unit 122, and an aggregation unit 123.

The first input unit 121 is configured to input the at least two sub-image features into a first attention sub-network in an image recognition model. The first attention sub-network includes a weight learning network layer and a weighting aggregation network layer.

The weight fitting unit 122 is configured to perform weight fitting processing on the at least two sub-image features through the weight learning network layer to obtain attention weights corresponding to the at least two sub-image features.

The aggregation unit 123 is configured to weight each sub-image feature according to the attention weight through the weighting aggregation network layer to obtain a weighted sub-image feature corresponding to each sub-image feature, and aggregate the weighted sub-image features corresponding to the at least two sub-image features to obtain the first feature vector.

For specific implementations of the first input unit 121, the weight fitting unit 122, and the aggregation unit 123, reference may be made to the relevant description of the embodiment corresponding to FIG. 4.

The second vector generation module 13 includes: a second input unit 131, a clustering sampling unit 132, a global self-attention determination unit 133, a self-attention determination unit 134, and a mean pooling unit 135.

The second input unit 131 is configured to input the at least two sub-image features into a second attention sub-network in an image recognition model. The second attention sub-network includes a clustering sampling network layer, a global self-attention network layer, a self-attention network layer, and a mean pooling network layer.

The clustering sampling unit 132 is configured to perform clustering sampling processing on the at least two sub-image features through the clustering sampling network layer to obtain at least two classification clusters including sampled sub-image features. The sum of the numbers of sampled sub-image features included in the at least two classification clusters is N. N is a positive integer less than the number of the at least two sub-image features.

The global self-attention determination unit 133 is configured to determine block sparse global self-attention weight matrices of N sampled sub-image features based on the block sparse matrix through the global self-attention network layer.

The self-attention determination unit 134 is configured to determine the block sparse self-attention corresponding to each sampled sub-image feature according to the at least two classification clusters and the block sparse global self-attention weight matrices through the self-attention network layer.

The mean pooling unit 135 is configured to perform mean pooling processing on the at least two block sparse self-attentions through the mean pooling network layer to obtain the second feature vector.

For specific implementations of the second input unit 131, the clustering sampling unit 132, the global self-attention determination unit 133, the self-attention determination unit 134, and the mean pooling unit 135, reference may be made to the relevant description of the embodiment corresponding to FIG. 4.

The clustering sampling unit 132 includes: a clustering subunit 1321 and a sampling subunit 1322.

The clustering subunit 1321 is configured to cluster the at least two sub-image features through the clustering sampling network layer to obtain the at least two classification clusters.

The sampling subunit 1322 is configured to obtain a $k^{th}$ classification cluster from the at least two classification clusters. k is a positive integer. The $k^{th}$ classification cluster includes at least one clustered sub-image feature.

The sampling subunit 1322 is further configured to obtain a vector distance between the at least one clustered sub-image feature and a cluster center of the $k^{th}$ classification cluster as a reference distance.

The sampling subunit 1322 is further configured to sequentially obtain h clustered sub-image features from the at least one clustered sub-image feature according to the reference distance, and take the h clustered sub-image features as the sampled sub-image features included in the $k^{th}$ classification cluster. h is a positive integer, and h is less than or equal to the number of the at least one clustered sub-image feature.

For specific implementations of the clustering subunit 1321 and the sampling subunit 1322, reference may be made to the relevant description of the embodiment corresponding to FIG. 4.

The second attention sub-network includes a query weight matrix and a key weight matrix.

The global self-attention determination unit 133 includes: a first initialization subunit 1331, a matrix determination subunit 1332, and a normalization subunit 1333.

The first initialization subunit 1331 is configured to construct a sampled sub-image feature matrix according to the sampled sub-image features included in the at least two classification clusters through the global self-attention network layer.

The first initialization subunit 1331 is further configured to multiply the sampled sub-image feature matrix and the query weight matrix to obtain a query matrix, and multiply the sampled sub-image feature matrix and the key weight matrix to obtain a key matrix.

The matrix determination subunit 1332 is configured to determine a block sparse global correlation matrix according to the query matrix, a transposition matrix corresponding to the key matrix, and the block sparse matrix.

The normalization subunit 1333 is configured to normalize the block sparse global correlation matrix to obtain the block sparse global self-attention weight matrix.

For specific implementations of the first initialization subunit 1331, the matrix determination subunit 1332, and the normalization subunit 1333, reference may be made to the relevant description of the embodiment corresponding to FIG. 4.

The second attention sub-network further includes a value weight matrix. The N sampled sub-image features include a sampled sub-image feature $N_j$, where j is a positive integer less than or equal to N.

The self-attention determination unit 134 includes: a target obtaining subunit 1341 and a determination subunit 1342.

The target obtaining subunit 1341 is configured to multiply the sampled sub-image feature matrix and the value weight matrix through the self-attention network layer to obtain a value matrix.

The target obtaining subunit 1341 is further configured to take the sampled sub-image feature in the classification cluster to which the sampled sub-image feature $N_j$ belongs as a target sampled sub-image feature.

The target obtaining subunit 1341 is further configured to obtain a block sparse global self-attention weight between the sampled sub-image feature $N_j$ and the target sampled sub-image feature from the block sparse global self-attention weight matrix as a target block sparse global self-attention weight.

The target obtaining subunit 1341 is further configured to obtain, from the value matrix, a value vector corresponding to the target sampled sub-image feature as a target value vector.

The determination subunit 1342 is configured to determine the block sparse self-attention corresponding to the sampled sub-image feature $N_j$ according to the target value vector and the target block sparse global self-attention weight.

For specific implementations of the target obtaining subunit 1341 and the determination subunit 1342, reference may be made to the relevant description of the embodiment corresponding to FIG. 4.

The classification module 14 includes: a third input unit 141, a feature fusion unit 142, and a classification unit 143.

The third input unit 141 is configured to input the first feature vector and the second feature vector into a classification sub-network of an image recognition model. The classification sub-network includes a feature fusion network layer and a classification network layer.

The feature fusion unit 142 is configured to perform feature fusion processing on the first feature vector and the second feature vector through the feature fusion network layer to obtain a fusion feature vector.

The classification unit 143 is configured to classify the fusion feature vector through the classification network layer to obtain the classification result of the image.

For specific implementations of the third input unit 141, the feature fusion unit 142, and the classification unit 143, reference may be made to the relevant description of the embodiment corresponding to FIG. 4.

Figure 10:
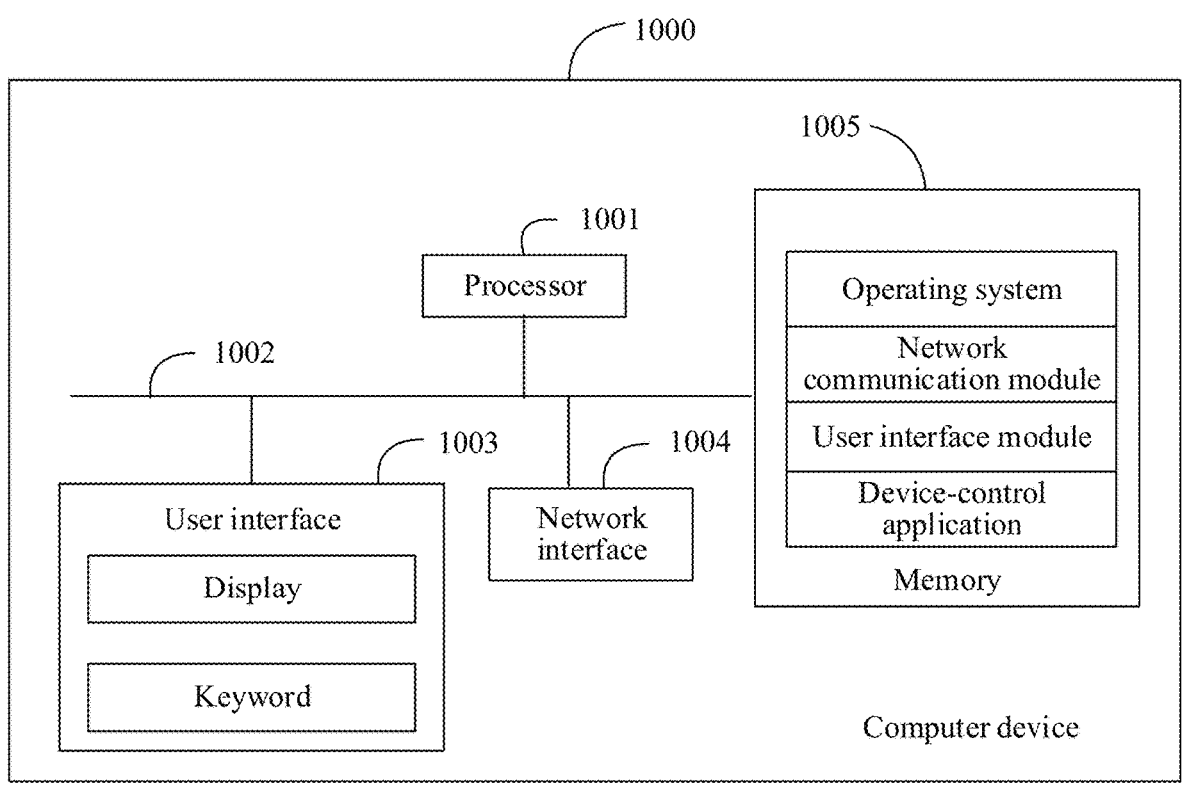
FIG. 10 is a schematic structural diagram of a computer device according to an embodiment of this disclosure.

Reference is made to FIG. 10. FIG. 10 is a schematic structural diagram of a computer device according to an embodiment of this disclosure. As shown in FIG. 10, the image detection apparatus 1 in the embodiment corresponding to FIG. 10 may be applied to a computer device 1000. The computer device 1000 may include: a processor 1001, a network interface 1004, and a memory 1005. Furthermore, the computer device 1000 may further include: a user interface 1003 and at least one communication bus 1002. The communication bus 1002 is configured to implement connection and communication between the components. The user interface 1003 may include a display, a keyboard. In some implementations, the user interface 1003 may further include a standard wired interface and a standard wireless interface. In some implementations, the network interface 1004 may include a standard wired interface and wireless interface (such as a WI-FI interface). The memory 1005 may be a high-speed random access memory (RAM), or may be a non-volatile memory, for example, at least one magnetic disk memory. In some implementations, the memory 1005 may be at least one storage apparatus that is located far away from the foregoing processor 1001. As shown in FIG. 10, the memory 1005 used as a computer-readable storage medium may include an operating system, a network communication module, a user interface module, and a device-control application.

In the computer device 1000 as shown in FIG. 10, the network interface 1004 may provide a network communication network element. The user interface 1003 is mainly used as an interface enabling input by a user. The processor 1001 may be configured to invoke the device-control application stored in the memory 1005 to implement the image detection method according to this embodiment of this disclosure.

It is to be understood that the computer device 1000 described in this embodiment of this disclosure may perform the description of the image detection method in the embodiment corresponding to FIG. 2 or FIG. 4. In addition, the beneficial effects of the same method are not described herein again.

Furthermore, this embodiment of this disclosure also provides a computer-readable storage medium. Computer programs executed by the aforementioned image detection apparatus 1 are stored in the computer-readable storage medium. The computer programs include program instructions. When the processor executes the program instructions, the description of the image detection method in the embodiment corresponding to FIG. 2 or FIG. 4 can be performed. Therefore. In addition, the beneficial effects of the same method are not described herein again. For technical details that are not disclosed in the computer-readable storage medium embodiment involved in this disclosure, reference is made to the description of the method embodiment of this disclosure.

Figure 11:
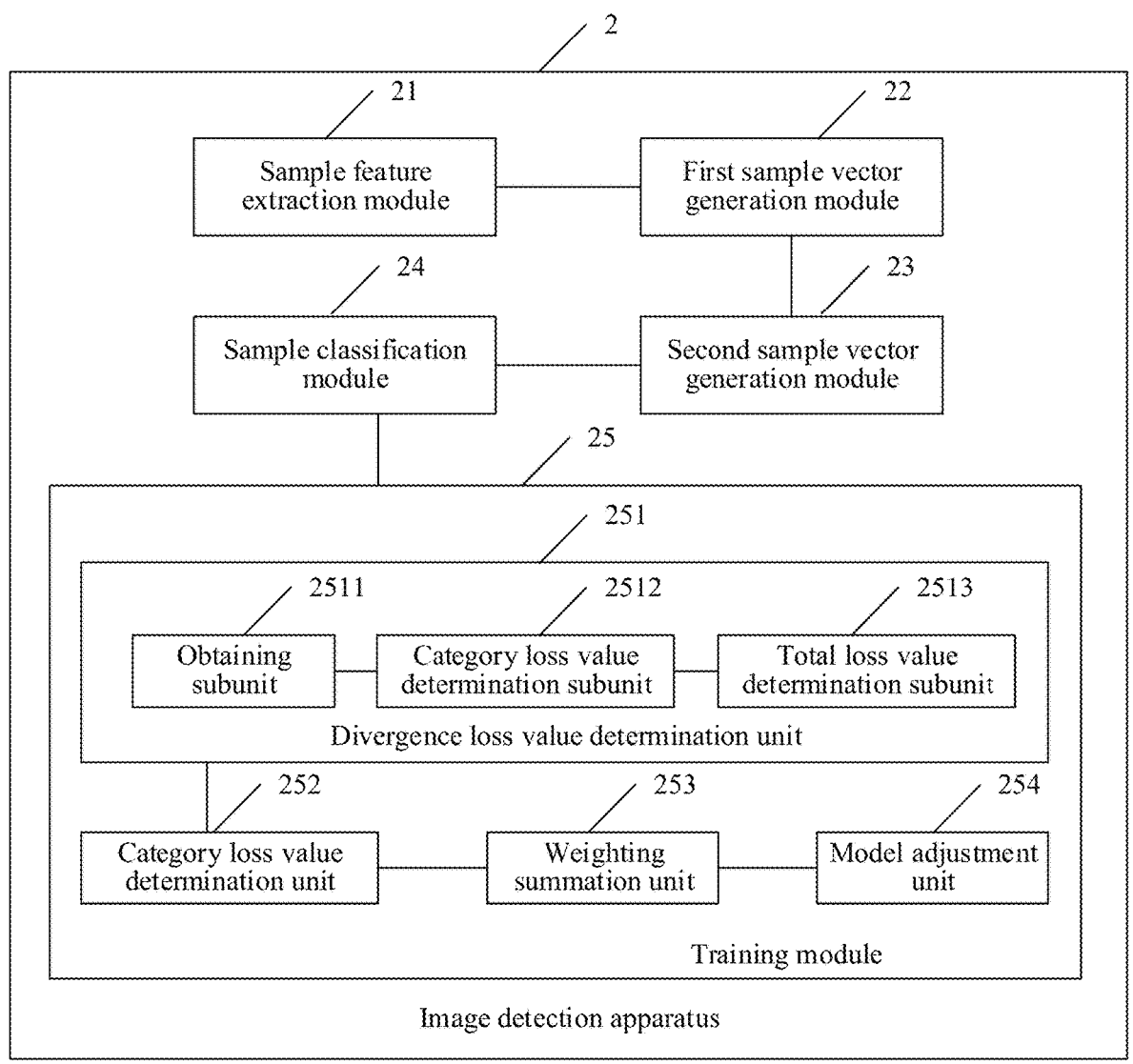
FIG. 11 is a schematic structural diagram of another image detection apparatus according to an embodiment of this disclosure.

Further, Reference is made to FIG. 11. FIG. 11 is a schematic structural diagram of another image detection apparatus according to an embodiment of this disclosure. The image detection apparatus 2 may be a computer program (including program codes) running in a computer device. For example, the image detection apparatus 2 is application software. The apparatus may be configured to perform corresponding steps in the method according to this embodiment of this disclosure. As shown in FIG. 11, the image detection apparatus 2 may include: a sample feature extraction module 21, a first sample vector generation module 22, a second sample vector generation module 23, a sample classification module 24, and a training module 25.

The sample feature extraction module 21 is configured to obtain a sample image, and perform feature extraction processing on the sample image to obtain a sample feature representation subset of the sample image. The sample image includes at least two sample sub-images. The sample feature representation subset includes at least two sample sub-image features, and the at least two sample sub-image features correspond to the at least two sample sub-images one to one.

The first sample vector generation module 22 is configured to input the at least two sample sub-images into an initial image recognition model, generate sample attention weights corresponding to the at least two sample sub-image features through the initial image recognition model, and perform weighting aggregation processing on the at least two sample sub-image features according to the sample attention weights corresponding to the at least two sample sub-image features to obtain a first sample feature vector.

The second sample vector generation module 23 is configured to perform clustering sampling processing on the at least two sample sub-image features through the initial image recognition model to obtain at least two sample classification clusters including sample sampled sub-image features, determine a sample block sparse self-attention corresponding to each sample sampled sub-image feature according to the at least two sample classification clusters and a block sparse matrix, and determine a second sample feature vector according to the at least two sample block sparse self-attentions. The sample block sparse self-attentions corresponding to the sample sampled sub-image features are determined based on the sample sampled sub-image features in the sample classification clusters to which the sample sampled sub-image features belong.

The sample classification module 24 is configured to determine a sample classification result of the sample image according to the first sample feature vector and the second sample feature vector through the initial image recognition model.

The training module 25 is configured to adjust model parameters of the initial image recognition model according to the at least two sample classification clusters, the attention weights corresponding to the at least two sample sub-image features, the sample classification result, and a classification label corresponding to the sample image to obtain an image recognition model for recognizing a classification result of an image.

For specific implementations of the sample feature extraction module 21, the first sample vector generation module 22, the second sample vector generation module 23, the sample classification module 24, and the training module 25, reference may be made to the relevant description of the embodiment corresponding to FIG. 8.

The training module 25 includes: a divergence loss value determination unit 251, a classification loss value determination unit 252, a weighting summation unit 253, and a model adjustment unit 254.

The divergence loss value determination unit 251 is configured to determine a divergence loss value according to the at least two sample classification clusters and the sample attention weights corresponding to the at least two sample sub-image features.

The classification loss value determination unit 252 is configured to determine a classification loss value according to the sample classification result and the classification label corresponding to the sample image.

The weighting summation unit 253 is configured to perform weighting summation on the divergence loss value and the classification loss value to obtain a total model loss value.

The model adjustment unit 254 is configured to adjust the model parameters of the initial image recognition model according to the total model loss value to obtain the image recognition model.

For specific implementations of the divergence loss value determination unit 251, the classification loss value determination unit 252, the weighting summation unit 253, and the model adjustment unit 254, reference may be made to the relevant description of the embodiment corresponding to FIG. 8.

The divergence loss value determination unit 251 includes: an obtaining subunit 2511, a category divergence loss value determination subunit 2512, and a total loss value determination subunit 2513.

The obtaining subunit 2511 is configured to obtain an $i^{th}$ sample classification cluster from the at least two sample classification clusters. i is a positive integer, and i is less than or equal to the number of the at least two sample classification clusters.

The obtaining subunit 2511 is further configured to take sample sub-image features included in the $i^{th}$ sample classification cluster as target sample sub-image features.

The category divergence loss value determination subunit 2512 is configured to determine a category divergence loss value corresponding to the $i^{th}$ sample classification cluster according to sample attention weights corresponding to the target sample sub-image features and the number of the target sample sub-image features.

The total loss value determination subunit 2513 is configured to accumulate the category divergence loss values corresponding to the sample classification clusters to obtain the divergence loss value.

The category divergence loss value determination subunit 2512 is specifically configured to: obtain a fitting attention distribution composed of sample attention weights corresponding to the target sample sub-image features; normalize the fitting attention weight distribution to obtain a normalized fitting attention distribution; take a uniform attention distribution corresponding to the number of the target sample sub-image features as an attention distribution label; and determine the category divergence loss value corresponding to the $i^{th}$ sample classification cluster according to the normalized fitting attention distribution and the attention distribution label.

For specific implementations of the obtaining subunit 2511, the category divergence loss value determination subunit 2512, and the total loss value determination subunit 2513, reference may be made to the relevant description of the embodiment corresponding to FIG. 8.

Figure 12:
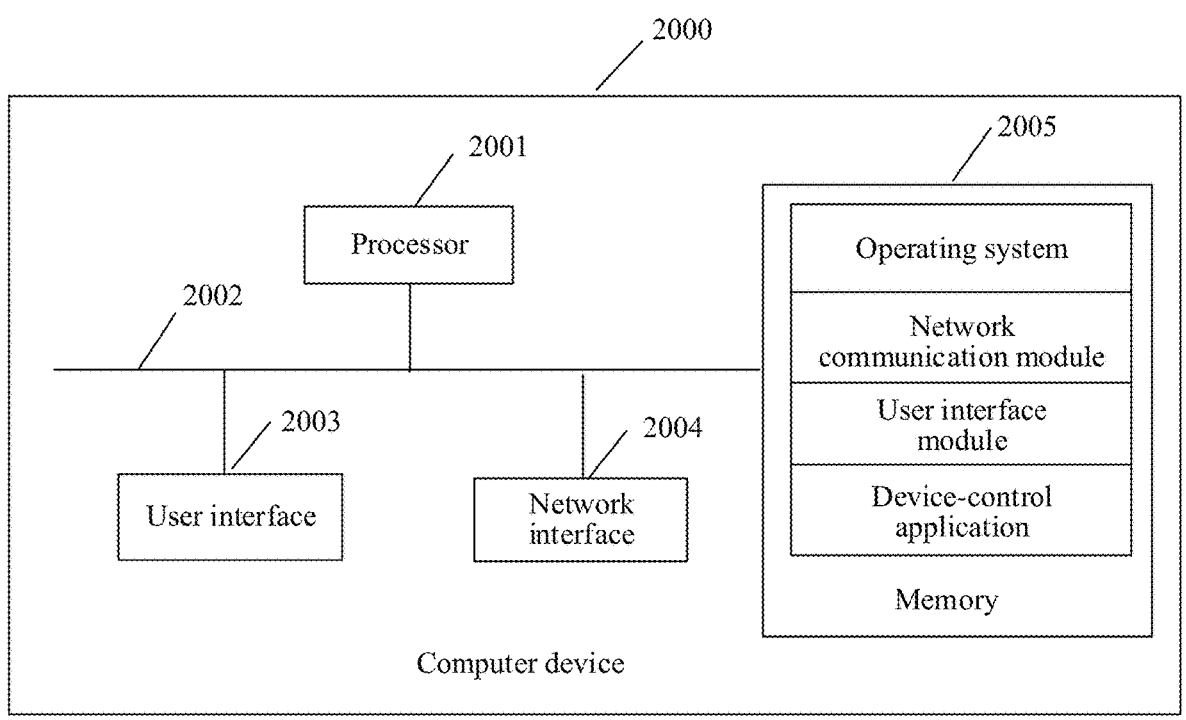
FIG. 12 is a schematic structural diagram of another computer device according to an embodiment of this disclosure.

Further, reference is made to FIG. 12. FIG. 12 is a schematic structural diagram of another computer device according to an embodiment of this disclosure. As shown in FIG. 12, the image detection apparatus 2 in the embodiment corresponding to FIG. 11 may be applied to a computer device 2000. The computer device 2000 may include: a processor 2001, a network interface 2004, and a memory 2005. Furthermore, the computer device 2000 further includes: a user interface 2003 and at least one communication bus 2002. The communication bus 2002 is configured to implement connection and communication between the components. The user interface 2003 may include a display, a keyboard. In some implementations, the user interface 2003 may further include a standard wired interface and a standard wireless interface. In some implementations, the network interface 2004 may include a standard wired interface and wireless interface (such as a WI-FI interface). The memory 2005 may be a high-speed random access memory (RAM), or may be a non-volatile memory, for example, at least one magnetic disk memory. In some implementations, the memory 2005 may be at least one storage apparatus that is located far away from the foregoing processor 2001. As shown in FIG. 12, the memory 2005 used as a computer-readable storage medium may include an operating system, a network communication module, a user interface module, and a device-control application.

In the computer device 2000 shown in FIG. 12, the network interface 2004 may provide a network communication function. The user interface 2003 is mainly used as an interface enabling input by a user. The processor 2001 may be configured to invoke the device-control application stored in the memory 2005 to implement a method for training an initial image recognition model according to this embodiment of this disclosure.

It is to be understood that the computer device 2000 described in this embodiment of this disclosure may perform the description of the access control method in the foregoing embodiments or may perform the description of the image detection apparatus 2 in the embodiment corresponding to FIG. 11. In addition, the beneficial effects of the same method are not described herein again.

Furthermore, this embodiment of this disclosure also provides a computer-readable storage medium. Computer programs executed by the aforementioned image detection apparatus 2 are stored in the computer-readable storage medium. When the processor loads and executes the computer programs, the description of the access control method in any of the foregoing embodiments can be performed. In addition, the beneficial effects of the same method are not described herein again. For technical details that are not disclosed in the computer-readable storage medium embodiment involved in this disclosure, reference is made to the description of the method embodiment of this disclosure.

The computer-readable storage medium may be the image detection apparatus according to any of the foregoing embodiments or an internal storage unit of the computer device, for example, a hard disk or an internal memory of the computer device. The computer-readable storage medium may also be an external storage device of the computer device, such as a plug-in hard disk, a smart media card (SMC), a secure digital (SD) card, or a flash card provided on the computer device. Further, the computer-readable storage medium may also include both the internal storage unit and the external storage device of the computer device. The computer-readable storage medium is configured to store the computer program and other programs and data required by the computer device. The computer-readable storage medium may be further configured to temporarily store data that has been outputted or is to be outputted.

Furthermore, this embodiment of this disclosure also provides a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, whereby the computer device performs the method according to any of the foregoing embodiments.

The terms "first", "second", and the like in the specification, in the claims and in the drawings of the embodiments of this disclosure are used for distinguishing between different objects and not necessarily for describing a particular sequence. Furthermore, the terms "include" and any variations thereof are intended to cover a non-exclusive inclusion. For example, a process, method, apparatus, product, or device that contains a list of steps or units is not limited to the listed steps or modules, but may In some implementations include steps or modules not listed, or may In some implementations include other step units inherent to such process, method, apparatus, product, or device.

A person of ordinary skill in the art may be aware that, units and algorithm steps of the examples described in the disclosed embodiments in this specification may be implemented by electronic hardware, computer software, or a combination thereof. To clearly describe the interchangeability between the hardware and the software, the compositions and steps of the examples have been generally described based on network elements. Whether the network elements are executed in a mode of hardware or software depends on particular applications and design constraint conditions of the technical solutions. A person skilled in the art may use different methods to implement the described network elements for each particular application, but it is not to be considered that the implementation goes beyond the scope of this disclosure.

What is disclosed above is merely exemplary embodiments of this disclosure, and certainly is not intended to limit the scope of the claims of this disclosure. Therefore, equivalent variations made in accordance with the claims of this disclosure shall fall within the scope of this disclosure.

What is claimed is:

1. An image detection method, performed by a computer device, the method comprising:
   obtaining an image;
   performing feature extraction processing on the image to obtain a feature representation subset of the image, the image comprising at least two sub-images, the feature representation subset comprising at least two sub-image features, and the at least two sub-image features corresponding to the at least two sub-images respectively;
   generating attention weights corresponding to the at least two sub-image features;
   performing weighting aggregation processing on the at least two sub-image features according to the attention weights to obtain a first feature vector;
   performing clustering sampling processing on the at least two sub-image features to obtain at least two classification clusters comprising sampled sub-image features;
   determining a block sparse self-attention for each of the sampled sub-image features according to the at least two classification clusters and a block sparse matrix;
   determining a second feature vector according to at least two block sparse self-attentions respectively corresponding to the at least two classification clusters, a block sparse self-attention for a sampled sub-image feature being determined based on sampled sub-image features in a classification cluster to which the sampled sub-image feature belongs; and
   determining a classification result of the image according to the first feature vector and the second feature vector.

2. The method according to claim 1, wherein the performing feature extraction processing on the image to obtain the feature representation subset of the image comprises:
   recognizing a background region and a foreground region in the image;
   performing image segmentation on the image according to the background region and the foreground region to obtain a foreground image;
   scaling the foreground image according to a scaling magnification to obtain a scaled foreground image;
   cropping the scaled foreground image according to a preset sub-image length and a preset sub-image width to obtain the at least two sub-images, the preset sub-image length being less than a length of the scaled foreground image, and the preset sub-image width being less than a width of the scaled foreground image; and
   performing image feature extraction processing on the at least two sub-images to obtain sub-image features corresponding to the at least two sub-images; and
   determining a feature representation subset of the image according to the sub-image features corresponding to the at least two sub-images.

3. The method according to claim 1, wherein the generating the attention weights corresponding to the at least two sub-image features, and performing weighting aggregation processing on the at least two sub-image features according to the attention weights to obtain the first feature vector comprises:
inputting the at least two sub-image features into a first attention sub-network in an image recognition model, the first attention sub-network comprising a weight learning network layer and a weighting aggregation network layer;
performing weight fitting processing on the at least two sub-image features using the weight learning network layer to obtain attention weights corresponding to the at least two sub-image features; and
weighting each of the at least two sub-image features according to the attention weight using the weighting aggregation network layer to obtain a weighted sub-image feature corresponding to each of the at least two sub-image features, and aggregating the weighted sub-image features corresponding to the at least two sub-image features to obtain the first feature vector.

4. The method according to claim 1, wherein the performing clustering sampling processing on the at least two sub-image features to obtain the at least two classification clusters, determining the block sparse self-attention according to the at least two classification clusters and the block sparse matrix, and determining the second feature vector according to the at least two block sparse self-attentions comprises:
inputting the at least two sub-image features into a second attention sub-network in an image recognition model, the second attention sub-network comprising a clustering sampling network layer, a global self-attention network layer, a self-attention network layer, and a mean pooling network layer;
performing clustering sampling processing on the at least two sub-image features using the clustering sampling network layer to obtain the at least two classification clusters, a classification cluster comprising the sampled sub-image features, a sum number of sampled sub-image features comprised in the at least two classification clusters being N, and N being a positive integer less than a number of the at least two sub-image features;
determining block sparse global self-attention weight matrices of N sampled sub-image features based on the block sparse matrix using the global self-attention network layer;
determining the block sparse self-attention for each of the sampled sub-image features according to the at least two classification clusters and the block sparse global self-attention weight matrices using the self-attention network layer; and
performing mean pooling processing on the at least two block sparse self-attentions using the mean pooling network layer to obtain the second feature vector.

5. The method according to claim 4, wherein the performing clustering sampling processing on the at least two sub-image features using the clustering sampling network layer to obtain the at least two classification clusters comprises:
clustering the at least two sub-image features using the clustering sampling network layer to obtain the at least two classification clusters;
obtaining a $k^{th}$ classification cluster from the at least two classification clusters, k being a positive integer, and the $k^{th}$ classification cluster comprising at least one clustered sub-image feature;
obtaining a vector distance between the at least one clustered sub-image feature and a cluster center of the $k^{th}$ classification cluster as a reference distance; and
sequentially obtaining h clustered sub-image features from the at least one clustered sub-image feature according to the reference distance, and taking the h clustered sub-image features as the sampled sub-image features comprised in the $k^{th}$ classification cluster, h being a positive integer, and h being less than or equal to a number of the at least one clustered sub-image feature.

6. The method according to claim 4, wherein the second attention sub-network comprises a query weight matrix and a key weight matrix, and the determining the block sparse global self-attention weight matrices of N sampled sub-image features based on the block sparse matrix using the global self-attention network layer comprises:
constructing a sampled sub-image feature matrix according to the sampled sub-image features comprised in the at least two classification clusters using the global self-attention network layer;
multiplying the sampled sub-image feature matrix and the query weight matrix to obtain a query matrix, and multiplying the sampled sub-image feature matrix and the key weight matrix to obtain a key matrix;
determining a block sparse global correlation matrix according to the query matrix, a transposition matrix corresponding to the key matrix, and the block sparse matrix; and
normalizing the block sparse global correlation matrix to obtain a block sparse global self-attention weight matrix.

7. The method according to claim 6, wherein the second attention sub-network comprises a value weight matrix, the N sampled sub-image features comprise a sampled sub-image feature $N_j$, j being a positive integer less than or equal to N, and the determining the block sparse self-attention according to the at least two classification clusters and the block sparse global self-attention weight matrices using the self-attention network layer comprises:
multiplying the sampled sub-image feature matrix and the value weight matrix using the self-attention network layer to obtain a value matrix;
taking the sampled sub-image feature in a classification cluster to which the sampled sub-image feature $N_j$ belongs as a target sampled sub-image feature;
obtaining a block sparse global self-attention weight between the sampled sub-image feature $N_j$ and the target sampled sub-image feature from the block sparse global self-attention weight matrix as a target block sparse global self-attention weight;
obtaining, from the value matrix, a value vector corresponding to the target sampled sub-image feature as a target value vector; and
determining a block sparse self-attention for the sampled sub-image feature $N_j$ according to the target value vector and the target block sparse global self-attention weight.

8. The method according to claim 1, wherein the determining the classification result of the image according to the first feature vector and the second feature vector comprises:
inputting the first feature vector and the second feature vector into a classification sub-network of an image recognition model, the classification sub-network comprising a feature fusion network layer and a classification network layer;

performing feature fusion processing on the first feature vector and the second feature vector using the feature fusion network layer to obtain a fusion feature vector; and classifying the fusion feature vector using the classification network layer to obtain the classification result of the image.

9. An image detection method, performed by a computer device, the method comprising:

obtaining a sample image;

performing feature extraction processing on the sample image to obtain a sample feature representation subset of the sample image, the sample image comprising at least two sample sub-images, the sample feature representation subset comprising at least two sample sub-image features, and the at least two sample sub-image features corresponding to the at least two sample sub-images respectively;

inputting the at least two sample sub-images into an initial image recognition model, generating sample attention weights corresponding to the at least two sample sub-image features using the initial image recognition model;

performing weighting aggregation processing on the at least two sample sub-image features according to the sample attention weights corresponding to the at least two sample sub-image features to obtain a first sample feature vector;

performing clustering sampling processing on the at least two sample sub-image features using the initial image recognition model to obtain at least two sample classification clusters comprising sample sampled sub-image features;

determining a sample block sparse self-attention for each of the sample sampled sub-image features according to the at least two sample classification clusters and a block sparse matrix;

determining a second sample feature vector according to at least two sample block sparse self-attentions respectively corresponding to the at least two sample classification clusters, a sample block sparse self-attention for a sample sampled sub-image feature being determined based on sample sampled sub-image features in a sample classification cluster to which the sample sampled sub-image feature belongs;

determining a sample classification result of the sample image according to the first sample feature vector and the second sample feature vector using the initial image recognition model; and adjusting model parameters of the initial image recognition model according to the at least two sample classification clusters, the attention weights corresponding to the at least two sample sub-image features, the sample classification result, and a classification label corresponding to the sample image to obtain an image recognition model for recognizing a classification result of an image.

10. The method according to claim 9, wherein the adjusting the model parameters of the initial image recognition model comprises:

determining a divergence loss value according to the at least two sample classification clusters and the sample attention weights corresponding to the at least two sample sub-image features;

determining a classification loss value according to the sample classification result and the classification label corresponding to the sample image;

performing weighting summation on the divergence loss value and the classification loss value to obtain a total model loss value; and adjusting the model parameters of the initial image recognition model according to the total model loss value to obtain the image recognition model.

11. The method according to claim 10, wherein the determining the divergence loss value according to the at least two sample classification clusters and the sample attention weights corresponding to the at least two sample sub-image features comprises:

obtaining an $i^{th}$ sample classification cluster from the at least two sample classification clusters, i being a positive integer, and i being less than or equal to a number of the at least two sample classification clusters;

taking sample sub-image features comprised in the $i^{th}$ sample classification cluster as target sample sub-image features;

determining a category divergence loss value corresponding to the $i^{th}$ sample classification cluster according to sample attention weights corresponding to the target sample sub-image features and a number of the target sample sub-image features; and accumulating category divergence loss values corresponding to the sample classification clusters to obtain the divergence loss value.

12. The method according to claim 11, wherein the determining the category divergence loss value corresponding to the $i^{th}$ sample classification cluster according to sample attention weights corresponding to the target sample sub-image features and the number of the target sample sub-image features comprises:

obtaining a fitting attention distribution comprising sample attention weights corresponding to the target sample sub-image features;

normalizing the fitting attention weight distribution to obtain a normalized fitting attention distribution;

taking a uniform attention distribution corresponding to the number of the target sample sub-image features as an attention distribution label; and determining the category divergence loss value corresponding to the $i^{th}$ sample classification cluster according to the normalized fitting attention distribution and the attention distribution label.

13. An image detection apparatus, comprising:

a memory operable to store computer-readable instructions; and a processor circuitry operable to read the computer-readable instructions, the processor circuitry when executing the computer-readable instructions is configured to:

obtain an image;

perform feature extraction processing on the image to obtain a feature representation subset of the image, the image comprising at least two sub-images, the feature representation subset comprising at least two sub-image features, and the at least two sub-image features corresponding to the at least two sub-images respectively;

generate attention weights corresponding to the at least two sub-image features;

perform weighting aggregation processing on the at least two sub-image features according to the attention weights to obtain a first feature vector;

perform clustering sampling processing on the at least two sub-image features to obtain at least two classification clusters comprising sampled sub-image features;

determine a block sparse self-attention for each of the sampled sub-image features according to the at least two classification clusters and a block sparse matrix;

determine a second feature vector according to at least two block sparse self-attentions respectively corresponding to the at least two classification clusters, a block sparse self-attention for a sampled sub-image feature being determined based on sampled sub-image features in a classification cluster to which the sampled sub-image feature belongs; and determine a classification result of the image according to the first feature vector and the second feature vector.

14. The apparatus according to claim 13, wherein the processor circuitry is configured to:

recognize a background region and a foreground region in the image;

perform image segmentation on the image according to the background region and the foreground region to obtain a foreground image;

scale the foreground image according to a scaling magnification to obtain a scaled foreground image;

crop the scaled foreground image according to a preset sub-image length and a preset sub-image width to obtain the at least two sub-images, the preset sub-image length being less than a length of the scaled foreground image, and the preset sub-image width being less than a width of the scaled foreground image; and perform image feature extraction processing on the at least two sub-images to obtain sub-image features corresponding to the at least two sub-images; and determine a feature representation subset of the image according to the sub-image features corresponding to the at least two sub-images.

15. The apparatus according to claim 13, wherein the processor circuitry is configured to:

input the at least two sub-image features into a first attention sub-network in an image recognition model, the first attention sub-network comprising a weight learning network layer and a weighting aggregation network layer;

perform weight fitting processing on the at least two sub-image features using the weight learning network layer to obtain attention weights corresponding to the at least two sub-image features; and weight each of the at least two sub-image features according to the attention weight using the weighting aggregation network layer to obtain a weighted sub-image feature corresponding to each of the at least two sub-image features, and aggregate the weighted sub-image features corresponding to the at least two sub-image features to obtain the first feature vector.

16. The apparatus according to claim 13, wherein the processor circuitry is configured to:

input the at least two sub-image features into a second attention sub-network in an image recognition model, the second attention sub-network comprising a clustering sampling network layer, a global self-attention network layer, a self-attention network layer, and a mean pooling network layer;

perform clustering sampling processing on the at least two sub-image features using the clustering sampling network layer to obtain the at least two classification clusters, a classification cluster comprising the sampled sub-image features, a sum number of sampled sub-image features comprised in the at least two classification clusters being N, and N being a positive integer less than a number of the at least two sub-image features;

determine block sparse global self-attention weight matrices of N sampled sub-image features based on the block sparse matrix using the global self-attention network layer;

determine the block sparse self-attention for each of the sampled sub-image features according to the at least two classification clusters and the block sparse global self-attention weight matrices using the self-attention network layer; and perform mean pooling processing on the at least two block sparse self-attentions using the mean pooling network layer to obtain the second feature vector.

17. The apparatus according to claim 16, wherein the processor circuitry is configured to:

cluster the at least two sub-image features using the clustering sampling network layer to obtain the at least two classification clusters;

obtain a $k^{th}$ classification cluster from the at least two classification clusters, k being a positive integer, and the $k^{th}$ classification cluster comprising at least one clustered sub-image feature;

obtain a vector distance between the at least one clustered sub-image feature and a cluster center of the $k^{th}$ classification cluster as a reference distance; and sequentially obtain h clustered sub-image features from the at least one clustered sub-image feature according to the reference distance, and take the h clustered sub-image features as the sampled sub-image features comprised in the $k^{th}$ classification cluster, h being a positive integer, and h being less than or equal to a number of the at least one clustered sub-image feature.

18. The apparatus according to claim 16, wherein the second attention sub-network comprises a query weight matrix and a key weight matrix, and the processor circuitry is configured to:

construct a sampled sub-image feature matrix according to the sampled sub-image features comprised in the at least two classification clusters using the global self-attention network layer;

multiply the sampled sub-image feature matrix and the query weight matrix to obtain a query matrix, and multiply the sampled sub-image feature matrix and the key weight matrix to obtain a key matrix;

determine a block sparse global correlation matrix according to the query matrix, a transposition matrix corresponding to the key matrix, and the block sparse matrix; and normalize the block sparse global correlation matrix to obtain a block sparse global self-attention weight matrix.

19. The apparatus according to claim 13, wherein the processor circuitry is configured to:

input the first feature vector and the second feature vector into a classification sub-network of an image recognition model, the classification sub-network comprising a feature fusion network layer and a classification network layer;

perform feature fusion processing on the first feature vector and the second feature vector using the feature fusion network layer to obtain a fusion feature vector; and classify the fusion feature vector using the classification network layer to obtain the classification result of the image.

20. A non-transitory machine-readable media, having instructions stored on the machine-readable media, the instructions configured to, when executed, cause a machine to:

obtain an image;

perform feature extraction processing on the image to obtain a feature representation subset of the image, the image comprising at least two sub-images, the feature representation subset comprising at least two sub-image features, and the at least two sub-image features corresponding to the at least two sub-images respectively;

generate attention weights corresponding to the at least two sub-image features;

perform weighting aggregation processing on the at least two sub-image features according to the attention weights to obtain a first feature vector;

perform clustering sampling processing on the at least two sub-image features to obtain at least two classification clusters comprising sampled sub-image features;

determine a block sparse self-attention for each of the sampled sub-image features according to the at least two classification clusters and a block sparse matrix;

determine a second feature vector according to at least two block sparse self-attentions respectively corresponding to the at least two classification clusters, a block sparse self-attention for a sampled sub-image feature being determined based on sampled sub-image features in a classification cluster to which the sampled sub-image feature belongs; and determine a classification result of the image according to the first feature vector and the second feature vector.

* * * * *